United States Patent
Bharadwaj et al.

(10) Patent No.: US 9,565,615 B2
(45) Date of Patent: Feb. 7, 2017

(54) EVOLVED HYBRID INTERNET PROTOCOL (IP) MULTIMEDIA SUBSYSTEM (IMS) ARCHITECTURE

(71) Applicant: QUALCOMM Incorporated, San Diego, CA (US)

(72) Inventors: Murali Bhaskara Rao Bharadwaj, San Diego, CA (US); Vikram Singh, Bangalore (IN); Srinivasan Balasubramanian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 361 days.

(21) Appl. No.: 13/895,038

(22) Filed: May 15, 2013

(65) Prior Publication Data
US 2013/0308620 A1    Nov. 21, 2013

Related U.S. Application Data

(60) Provisional application No. 61/647,840, filed on May 16, 2012.

(51) Int. Cl.
*H04W 40/02* (2009.01)
*H04L 29/06* (2006.01)

(52) U.S. Cl.
CPC .......... *H04W 40/02* (2013.01); *H04L 65/1016* (2013.01); *H04L 65/1073* (2013.01); *H04L 65/40* (2013.01)

(58) Field of Classification Search
CPC ..... H04W 40/02; H04L 65/1073; H04L 65/40; H04L 65/1016
See application file for complete search history.

(56) References Cited

U.S. PATENT DOCUMENTS

| 8,054,780 B1 | 11/2011 | Manroa et al. |
| 8,213,337 B2 * | 7/2012 | Low ...................... H04W 28/24 370/254 |

(Continued)

OTHER PUBLICATIONS

Henry K., et al., "Rich Communication Suite", Intelligence in Next Generation Networks, 2009. ICIN 2009. 13th International Conference on, IEEE, Piscataway, NJ, USA, Oct. 26, 2009 (Oct. 26, 2009), pp. 1-6, XP031582842, ISBN: 978-1-4244-4693-3 chapter II; paragraph [IV.A].

(Continued)

*Primary Examiner* — Pao Sinkantarakorn
*Assistant Examiner* — Michael Phillips
(74) *Attorney, Agent, or Firm* — Patterson & Sheridan, L.L.P.

(57) ABSTRACT

A method, apparatus, and computer program product for wireless communication are provided. The method generally includes registering a UE with an internet protocol multimedia subsystem (IMS) server for one or more native services and non-native services, wherein the UE comprises a modem processor and an application processor. The IMS server may comprise an RTP stack, wherein a portion of the RTP stack resides on the MP and a portion on the AP. A data packet may be received having an identifier of one of the native or non-native services. The data packet may be received from a WWAN or IWLAN. The data packet may be forwarded to the MP or to the AP based on the identifier. According to aspects, the data packet is forwarded to the MP if the identifier indicates an audio service and to the AP if the data packet indicates a video service.

52 Claims, 26 Drawing Sheets

(56) References Cited

U.S. PATENT DOCUMENTS

| | | | |
|---|---|---|---|
| 8,630,283 B1* | 1/2014 | Breau et al. | 370/352 |
| 9,107,049 B2 | 8/2015 | Lindsay et al. | |
| 2004/0190453 A1* | 9/2004 | Rasanen et al. | 370/235 |
| 2007/0019622 A1* | 1/2007 | Alt | H04L 29/06027 |
| | | | 370/352 |
| 2007/0173283 A1 | 7/2007 | Livet et al. | |
| 2007/0299913 A1 | 12/2007 | Griffin | |
| 2008/0181220 A1* | 7/2008 | Babbar | H04L 69/16 |
| | | | 370/389 |
| 2008/0261593 A1* | 10/2008 | Wong | H04W 72/048 |
| | | | 455/435.1 |
| 2008/0301308 A1* | 12/2008 | Li et al. | 709/228 |
| 2008/0317010 A1* | 12/2008 | Naqvi | H04L 65/1016 |
| | | | 370/355 |
| 2009/0005020 A1* | 1/2009 | McGowan et al. | 455/414.3 |
| 2009/0144429 A1 | 6/2009 | Astrom et al. | |
| 2009/0175239 A1* | 7/2009 | Grinshpun et al. | 370/331 |
| 2010/0064063 A1* | 3/2010 | Deforche et al. | 710/5 |
| 2010/0188975 A1 | 7/2010 | Raleigh | |
| 2010/0309847 A1* | 12/2010 | Bharadwaj | 370/328 |
| 2011/0051701 A1* | 3/2011 | Cai | H04L 65/1016 |
| | | | 370/338 |
| 2011/0171958 A1* | 7/2011 | Hua et al. | 455/435.2 |
| 2011/0264747 A1* | 10/2011 | Mutikainen | H04L 12/581 |
| | | | 709/206 |
| 2011/0302603 A1* | 12/2011 | Sugai | H04N 21/2408 |
| | | | 725/38 |
| 2012/0023245 A1* | 1/2012 | Mouquet et al. | 709/228 |
| 2012/0072601 A1 | 3/2012 | Bharadwaj | |
| 2012/0089442 A1* | 4/2012 | Olsson | G06Q 30/0207 |
| | | | 705/14.1 |
| 2012/0106570 A1 | 5/2012 | Li | |
| 2012/0155333 A1* | 6/2012 | Yoon | H04L 12/28 |
| | | | 370/259 |
| 2012/0236760 A1* | 9/2012 | Ionescu et al. | 370/259 |
| 2012/0246212 A1 | 9/2012 | Ahmad et al. | |
| 2012/0314650 A1* | 12/2012 | Medapalli | H04W 52/028 |
| | | | 370/328 |
| 2012/0320738 A1* | 12/2012 | Runeson | H04L 69/162 |
| | | | 370/221 |
| 2013/0016668 A1* | 1/2013 | Zhao | H04L 69/326 |
| | | | 370/329 |
| 2013/0301529 A1* | 11/2013 | Lindsay | H04W 4/12 |
| | | | 370/328 |
| 2014/0329504 A1* | 11/2014 | Gupta | H04Q 3/0045 |
| | | | 455/411 |
| 2015/0020120 A1* | 1/2015 | Cannon | H04N 21/4126 |
| | | | 725/62 |
| 2015/0039773 A1* | 2/2015 | Runeson et al. | 709/227 |
| 2015/0043453 A1* | 2/2015 | Hegarty | H04L 65/1016 |
| | | | 370/329 |

OTHER PUBLICATIONS

Partial International Search Report—PCT/US2013/041294—ISA/EPO—Aug. 6, 2013.
"3rd Generation Partnership Project; Technical Specification Group Services and System Aspects; IP Multimedia Subsystem (IMS); Stage 2 (Release 11)", 3GPP Standard; 3GPP TS 23.228, 3rd Generation Partnership Project (3GPP), Mobile Competence Centre , 650, Route Des Lucioles ; F-06921 Sophia-Antipolis Cedex; France, vol. SA WG2, No. V11.4.0, Mar. 8, 2012 (Mar. 8, 2012), pp. 1-287, XP050555333.
International Search Report and Written Opinion—PCT/US2013/041294—ISA/EPO—Nov. 22, 2013.
MD; D News Staff, "Software Optimizes Volte and RCS Services," Mobile Dev & Design, Feb. 27, 2013, 1 Page.
Mudigonda S., "RCS Platform Gives OTT Functionality Back to Operators," Imagination Technologies, Feb. 25, 2013, 3 pages.

* cited by examiner

EVOLVED HYBRID INTERNET PROTOCOL (IP) MULTIMEDIA SUBSYSTEM (IMS) ARCHITECTURE

CLAIM OF PRIORITY UNDER 35 U.S.C. §119

This application claims benefit of U.S. Provisional Patent Application Ser. No. 61/647,840, filed May 16, 2012, which is herein incorporated by reference in its entirety.

BACKGROUND

Field

The present disclosure relates generally to communication systems, and more particularly, to wireless data networks that provide multimedia services.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, systems and methods are disclosed for managing internet protocol (IP) multimedia subsystem (IMS), services at a user equipment (UE). A single IMS registration is used to support multiple services provided by a plurality of processors in the UE. The processors may share a single network address. An application processor hosts various applications that use services that are native to the modem processor and services that are non-native to the modem processor, including services provided by the application processor. Native and non-native services are registered using feature tags.

In an aspect of the disclosure, a method of wireless communication is provided. The method generally includes registering a user equipment (UE) with an internet protocol (IP) multimedia subsystem (IMS) server for one or more native services and for one or more non-native services, wherein the UE comprises a modem processor and an application processor, receiving a data packet having an identifier of one of the one or more natives services or one or more non-native services, and forwarding the data packet to the modem processor or to the application processor based on the identifier.

In an aspect of the disclosure, an apparatus for wireless communication is provided. The apparatus generally includes means for registering a user equipment (UE) with an internet protocol (IP) multimedia subsystem (IMS) server for one or more native services and for one or more non-native services, wherein the UE comprises a modem processor and an application processor, means for receiving a data packet having an identifier of one of the one or more natives services or one or more non-native services, and means for forwarding the data packet to the modem processor or to the application processor based on the identifier.

In an aspect of the disclosure, an apparatus for wireless communication is provided. The apparatus generally includes at least once processor configured to register a user equipment (UE) with an internet protocol (IP) multimedia subsystem (IMS) server for one or more native services and for one or more non-native services, wherein the UE comprises a modem processor and an application processor, receive a data packet having an identifier of one of the one or more natives services or one or more non-native services, and forward the data packet to the modem processor or to the application processor based on the identifier. The apparatus also includes a memory coupled with the at least one processor.

In an aspect of the disclosure, a computer program product is provided. The computer program product generally includes a computer-readable medium comprising code for registering a user equipment (UE) with an internet protocol (IP) multimedia subsystem (IMS) server for one or more native services and for one or more non-native services, wherein the UE comprises a modem processor and an application processor, receiving a data packet having an identifier of one of the one or more natives services or one or more non-native services, and forwarding the data packet to the modem processor or to the application processor based on the identifier.

In an aspect of the disclosure, a method of wireless communication is provided. The method generally includes establishing a network connection between an application processor of a user equipment (UE) with a packet data network (PDN), wherein the network connection is established in response to a request from an internet protocol (IP) multimedia subsystem (IMS) entity of a modem of the UE and providing access to the PDN to one or more IMS entities of the modem through the network connection.

In an aspect of the disclosure, an apparatus for wireless communication is provided. The apparatus generally includes means for establishing a network connection between an application processor of a user equipment (UE) with a packet data network (PDN), wherein the network connection is established in response to a request from an internet protocol (IP) multimedia subsystem (IMS) entity of a modem of the UE and means for providing access to the PDN to one or more IMS entities of the modem through the network connection.

In an aspect of the disclosure, an apparatus for wireless communication is provided. The apparatus generally includes at least once processor configured to establish a network connection between an application processor of a user equipment (UE) with a packet data network (PDN), wherein the network connection is established in response to a request from an internet protocol (IP) multimedia subsystem (IMS) entity of a modem of the UE and provide access to the PDN to one or more IMS entities of the modem through the network connection. The apparatus also includes a memory coupled with the at least one processor.

In an aspect of the disclosure, a computer program product is provided. The computer program product generally includes a computer-readable medium comprising code for establishing a network connection between an application processor of a user equipment (UE) with a packet data network (PDN), wherein the network connection is established in response to a request from an internet protocol (IP) multimedia subsystem (IMS) entity of a modem of the UE and providing access to the PDN to one or more IMS entities of the modem through the network connection.

DETAILED DESCRIPTION

Figure 1:
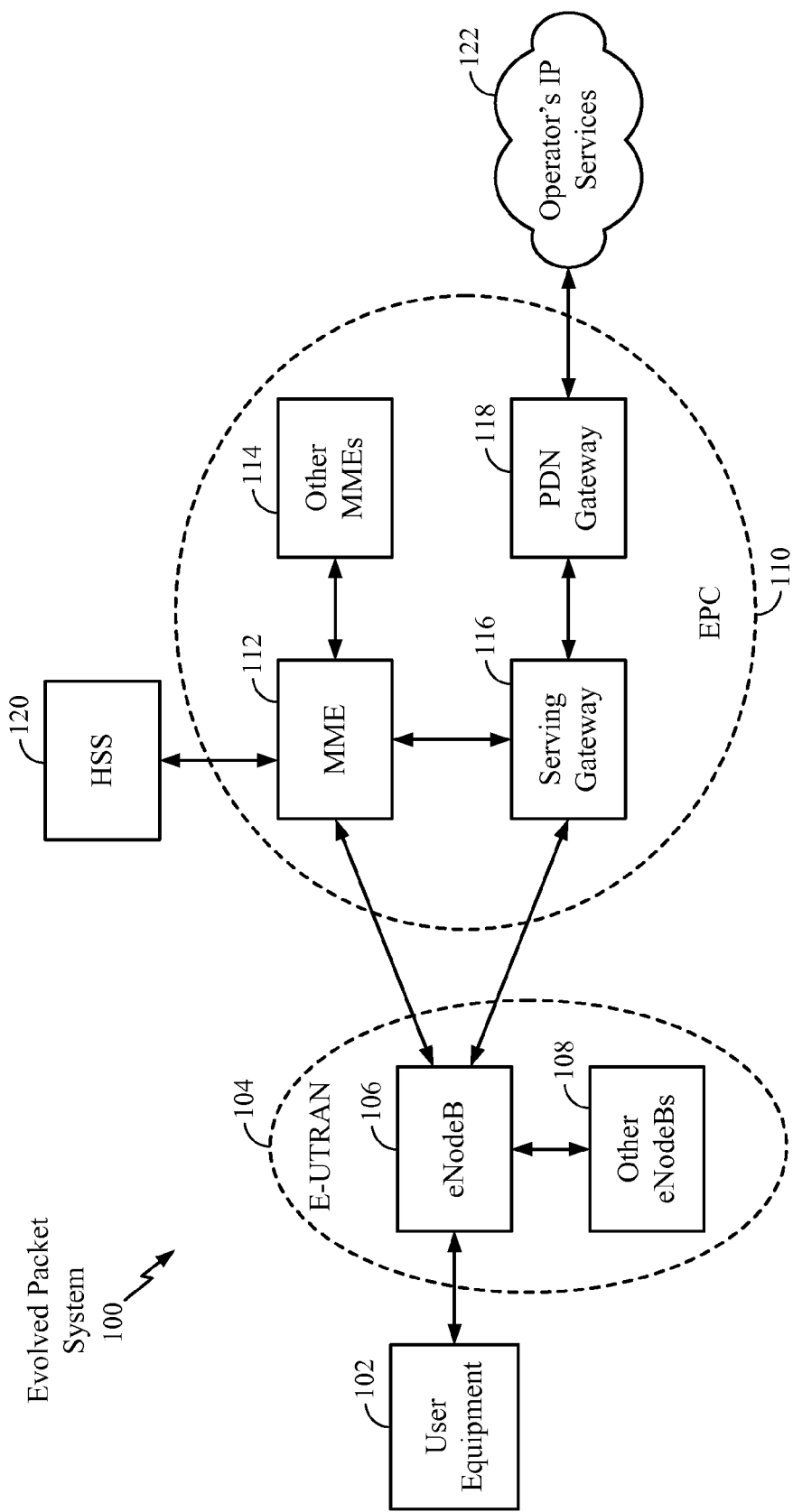
FIG. 1 is a diagram illustrating an example of a network architecture, in accordance with certain aspects of the present disclosure.

Techniques and apparatus are provided herein for data networks that provide multimedia services. A hybrid internet protocol multimedia subsystem (IMS) architecture is provided which splits the IMS across a modem processor and an application processor (AP). The hybrid IMS may allow multimedia services, such as video telephony, audio, SMS, chat, etc., sharing a single IP address, to be selectively filtered to the AP or modem processor. Additionally, the services can be filtered using a single dispatcher. After filtering, audio/video may be synchronized via a timestamp based AN sync.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Example Wireless Network

FIG. 1 is a diagram illustrating a long-term evolution (LTE) network architecture 100, in accordance with certain aspects of the present disclosure. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a PDN Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
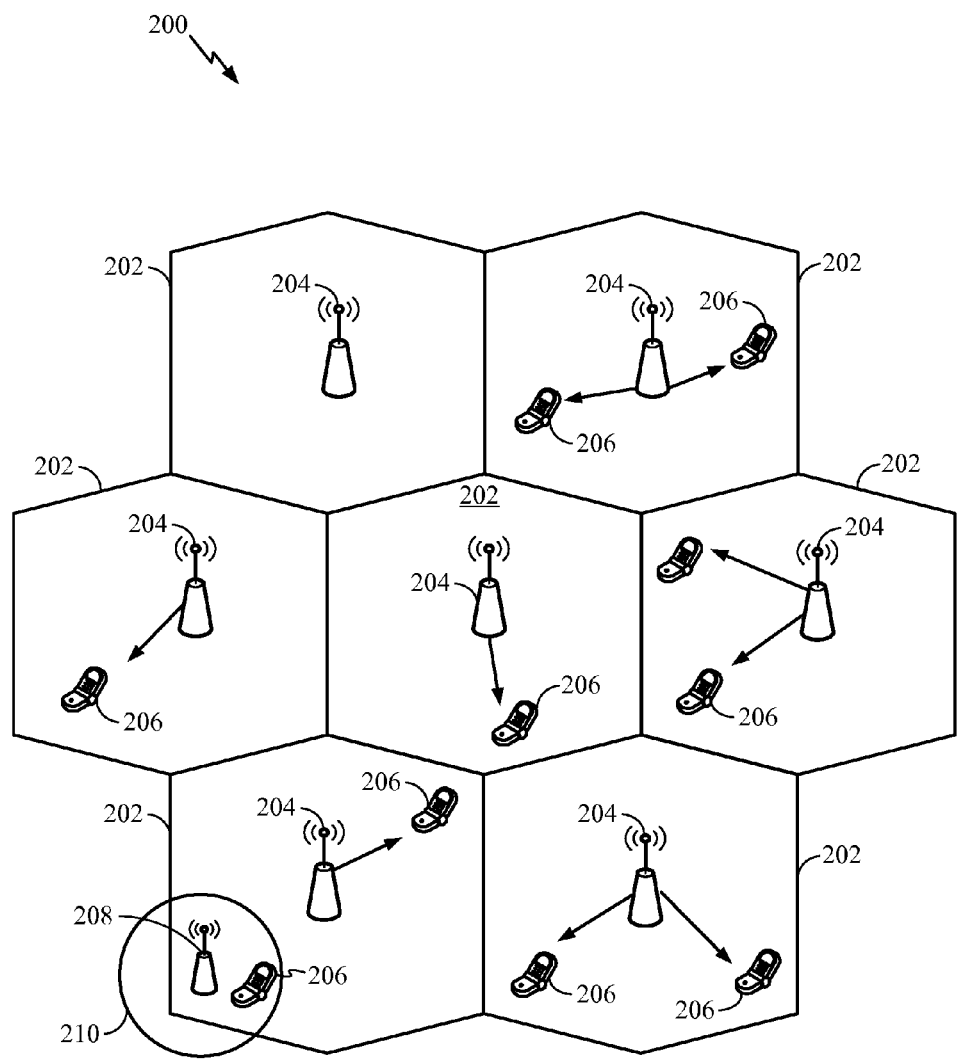
FIG. 2 is a diagram illustrating an example of an access network, in accordance with certain aspects of the present disclosure.

FIG. 2 is a diagram illustrating an example of an access network 200 in an LTE network architecture, in accordance with certain aspects of the present disclosure. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
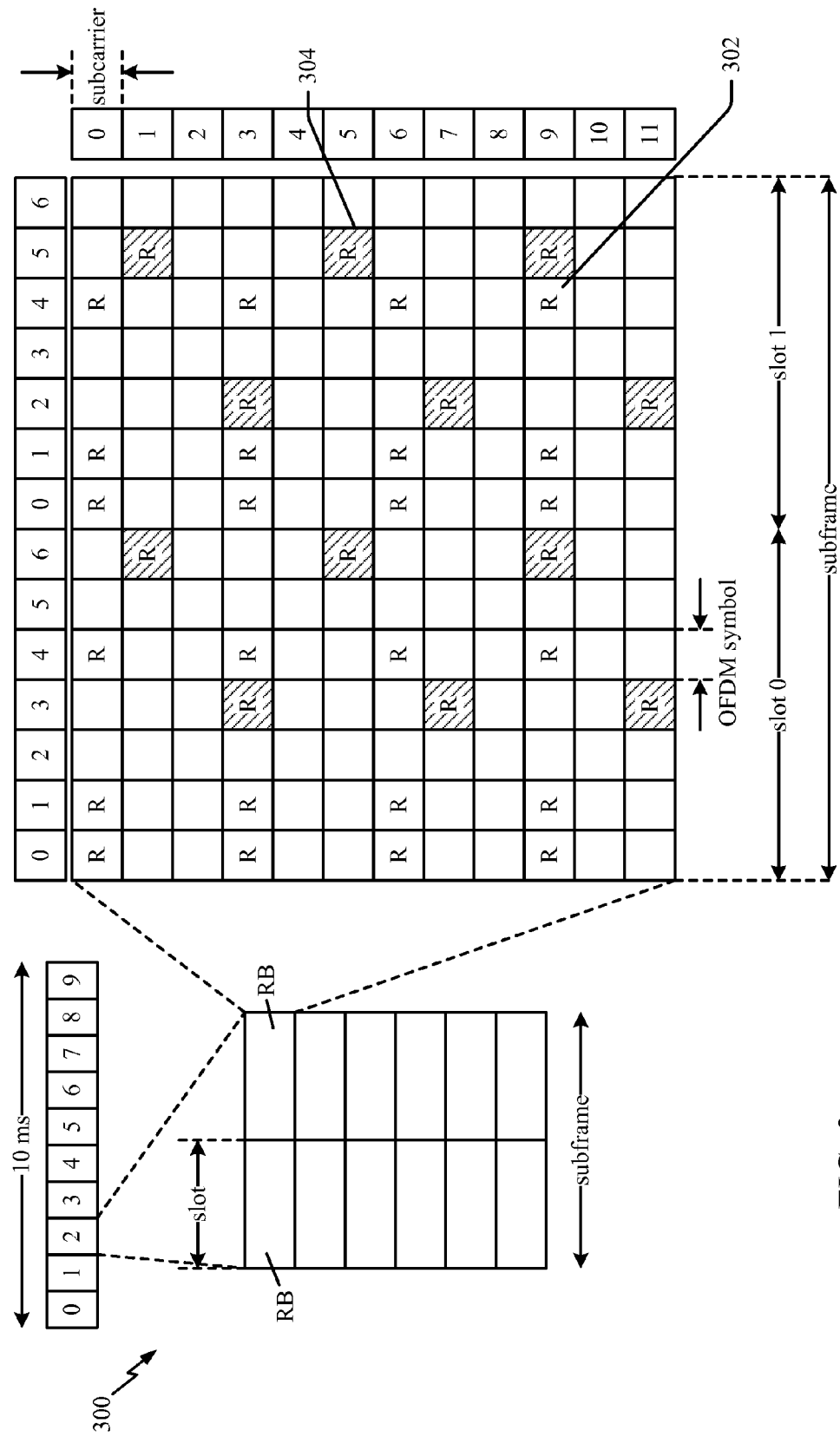
FIG. 3 is a diagram illustrating an example of a DL frame structure in LTE, in accordance with certain aspects of the present disclosure.

FIG. 3 is a diagram 300 illustrating an example of a DL frame structure in LTE, in accordance with certain aspects of the present disclosure. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
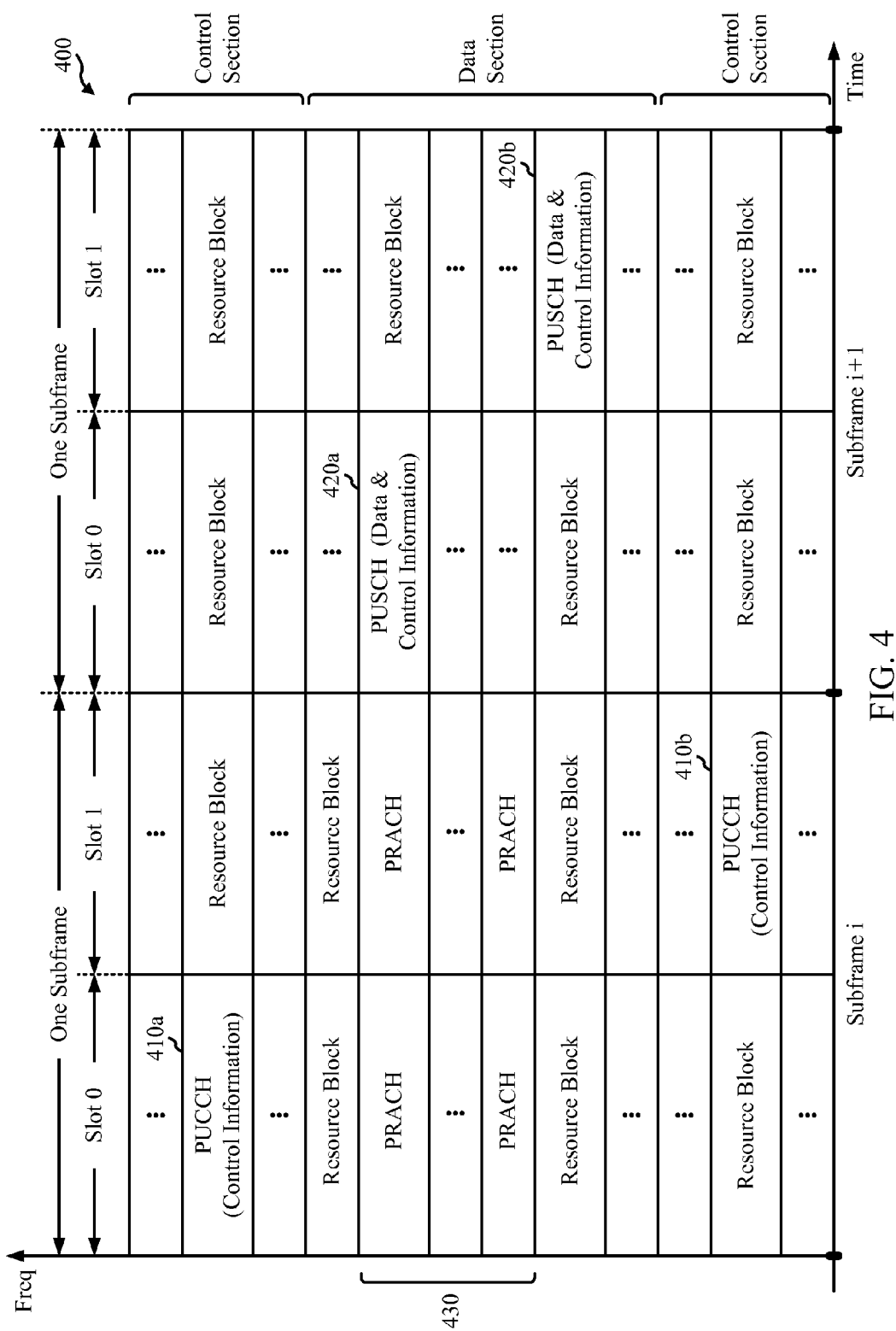
FIG. 4 is a diagram illustrating an example of an UL frame structure in LTE, in accordance with certain aspects of the present disclosure.

FIG. 4 is a diagram 400 illustrating an example of an UL frame structure in LTE, in accordance with certain aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
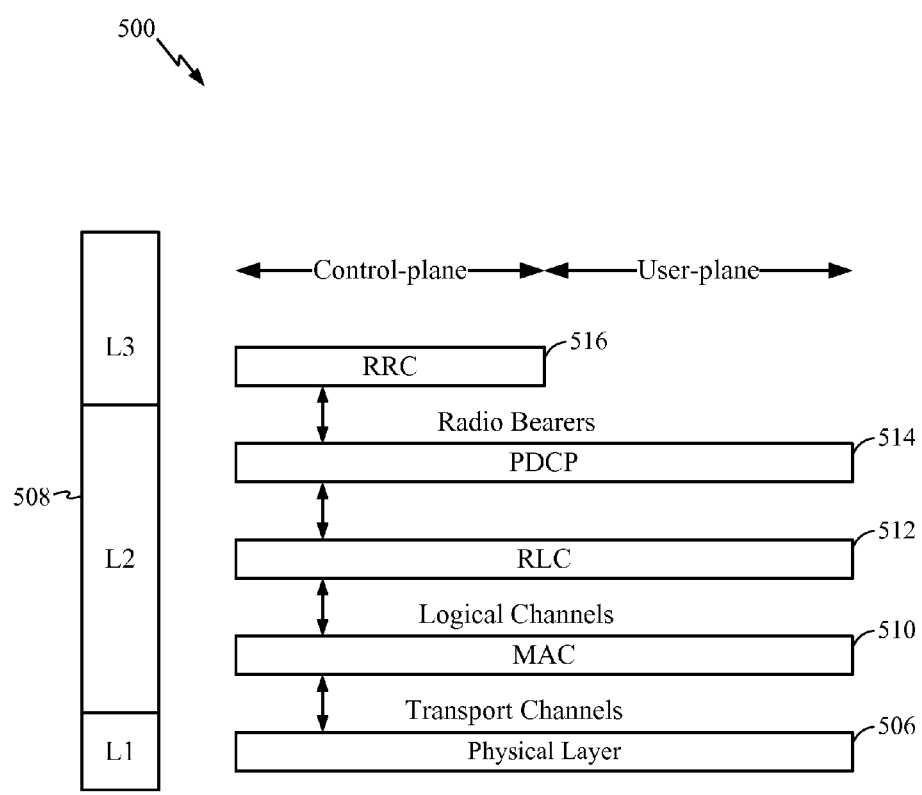
FIG. 5 is a diagram illustrating an example of a radio protocol architecture for the user and control planes, in accordance with certain aspects of the present disclosure.

FIG. 5 is a diagram 500 illustrating an example of a radio protocol architecture for the user and control planes in LTE, in accordance with certain aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
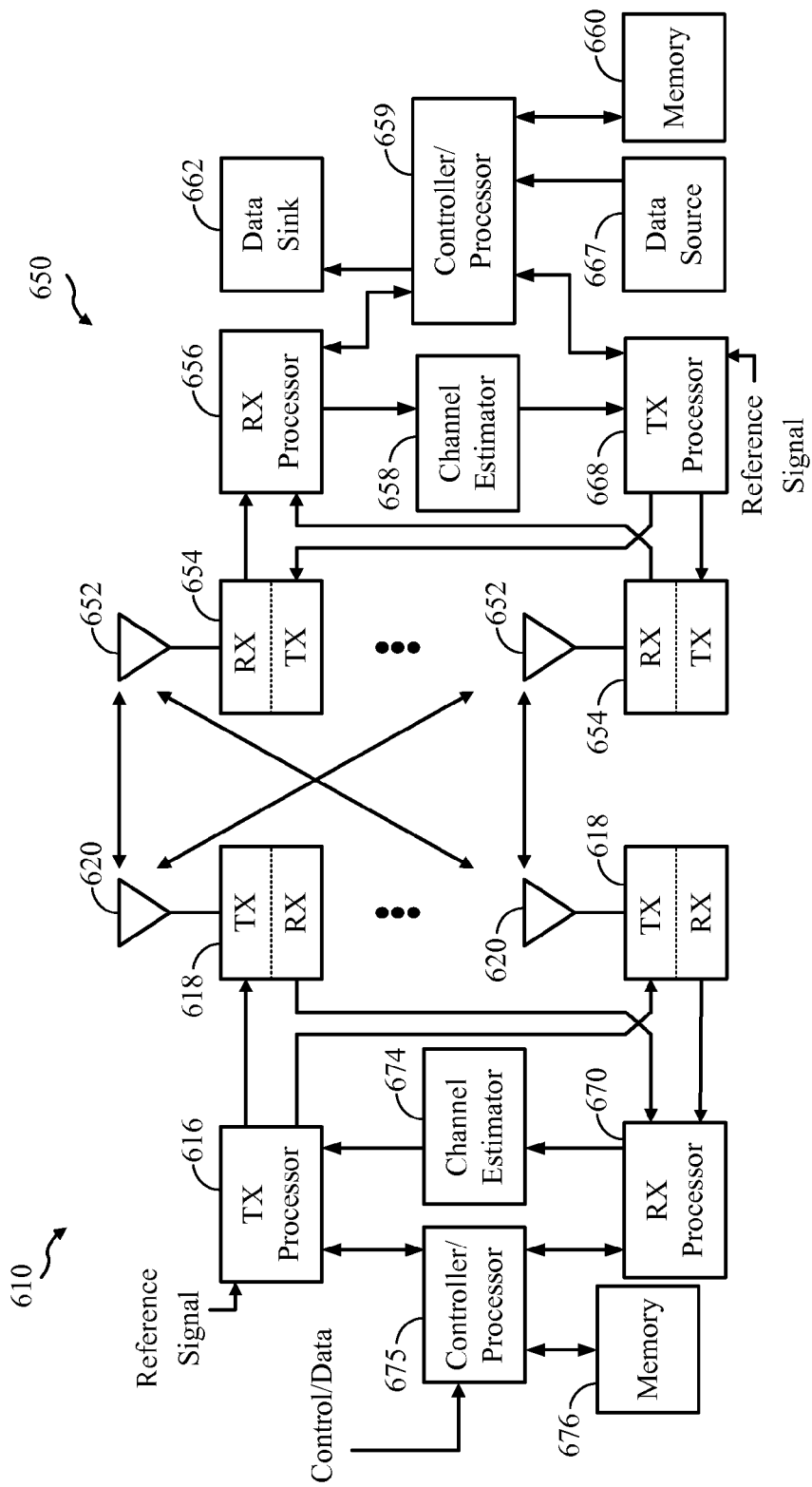
FIG. 6 is a diagram illustrating an example of an evolved Node B and user equipment in an access network, in accordance with certain aspects of the present disclosure.

FIG. 6 is a block diagram of an eNB 610 in communication with a UE 650 in an access network, in accordance with certain aspects of the present disclosure. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Example Evolved Hybrid Internet Protocol (IP) Multimedia Subsystem (IMS) Architecture Techniques and apparatus are provided herein for data networks that provide multimedia services. A hybrid internet protocol multimedia subsystem (IMS) architecture is provided which splits the IMS across a modem processor and an application processor (AP). The hybrid IMS may allow multimedia services, such as video telephony (VT) service, audio service, Simple Messaging System (SMS) service, chat service, etc., sharing a single IP address, to be selectively filtered to the AP or modem processor. Additionally, the services can be filtered using a single dispatcher. After filtering, an audio/video synchronization procedure utilizing a timestamp may be performed.

It is desirable to provide Voice and Video Telephony services over packet-based networks concurrently with internet data services on long-term evolution (LTE). It is desirable that IMS based architecture for Voice over LTE (VoLTE) key performance indicators (KPIs) meets KPIs for circuit-switched (CS) voice services over code division multiple access (CDMA) 1×RTT or universal mobile telecommunication systems (UMTS)/global systems for mobile communications (GSM) networks. A fully integrated modem-centric solution is desirable that has minimal impact to HLOS, for example, a solution that scales across multiple HLOSs and ensures maximum re-use of modem software across the different HLOSs.

According to certain aspects, an evolved hybrid IMS architecture may split IMS services into two categories: native radio coupled services (e.g., VoLTE, VT, SMS) and non-native data rich services (e.g., rich communications suite (RCS) and other data-centric IMS services). Such an architecture may allow seamless mobility between wireless wide area networks (WWAN) and interworking wireless local area network (IWLAN) domains.

Figure 7A:
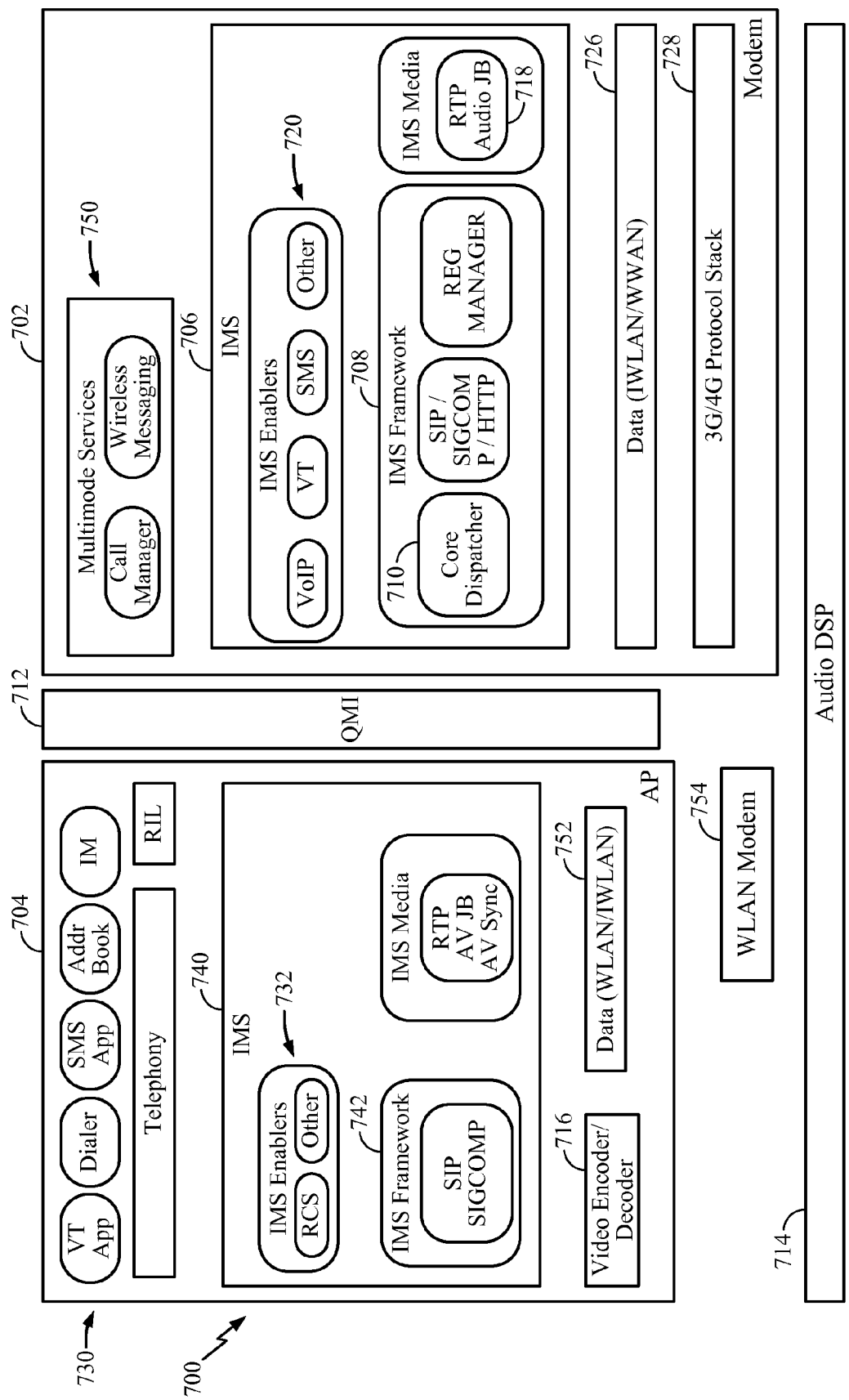
FIG. 7A is a diagram illustrating an example modem employing a hybrid IMS architecture, in accordance with certain aspects of the present disclosure.

FIG. 7A is a block schematic illustrating example functional elements of a UE 700, in accordance with certain aspects of the present disclosure. Various telephony related services may be implemented through data connections in a UE. As shown in FIG. 7A, the IMS may be split between the modem processor 702 and the application processor (AP) 704.

Certain common services 750 (e.g., multimode services) may be provided within a modem processor 702 of the UE 700 to provide call management and wireless messaging services. The modem processor 702 may also provide an IMS component 706 to support certain common applications 720 including voice over internet protocol (VoIP), VT, and SMS, etc. Applications 720 may interact with one or more communications stacks 726, 728 of the modem processor 702 and can include applications used for encoding and decoding various data streams, connection management, etc.

IMS components 706 and 740 may provide a standards-based networking architecture for multimedia services provided on the UE 700. IMS component 706 may include a core dispatcher 70 which can handle data flows related to both native services 750 and non-native services 730 provided by AP 704. Core dispatcher 710 may provide a single point of access for communication with an external IMS for multiple applications on UE 700 using a single IMS registration, without the need to perform as a proxy or back-to-back user agent for handling session initiation protocol (SIP) messaging. Core dispatcher 710 may effectively act as a relay for IMS related communications. IMS services provided by the processor 702 and AP 704 may be registered using IMS service tags. The core dispatcher 710 may route data to applications and services based on the IMS service tags used to register the applications and services. Thus, the UE 700 may be registered only once but may register a plurality of services, which can include native services 750 and non-native services 730. In some embodiments, the number of services registered for the UE 700 may be increased or decreased during operation. Although there is substantial benefit to be accrued by maintaining a single IMS registration for the UE 700, in some embodiments, an application or HLOS may be permitted to register separately with an IMS server.

IMS registration typically involves the exchange of session initiation protocol (SIP) messages to control communication sessions supporting voice and video calls over IP, LTE and other data networks. SIP may be used for establishing, modifying and terminating communications sessions and the sessions may be used for a plurality of media streams that support certain applications 720 and 730, including VoIP, VT, and SMS, etc.

In certain embodiments, an IMS entity 740 on AP 704 may cooperate with the IMS entity 706 on the modem processor 702 to permit independent development and deployment of applications on AP 704 while optimizing interactions with an IMS server. Core dispatcher 710 may be employed to direct data flows through IMS enablers 720 provided by modem processor 702 and through IMS enablers 732 on AP 704 and to redirect network traffic to external modem 754, and/or through communications stack 752 provided by AP 704. For example, a call established on LTE through the modem processor 702 may be seamlessly handed off to a VoIP connection on WLAN using external modem 754, whereby modem processor 702 maintains call signaling information and context, while data is transferred to the WLAN modem after the WLAN connection is established based on the signaling and context information maintained by modem processor 702.

Modem processor 702 may provide data networking functions that support IWLAN, which uses GSM signaling for voice services over circuit-switched UTRAN and WWAN over LTE, for example. In some embodiments AP 704 may include support for local or wide area networks and may use a modem for certain network communications. In one example, AP 704 may be a component 752 that provides protocol support for IWLAN and wireless local area network (WLAN) and that directs network communications through a WLAN modem 754.

Figure 7B:
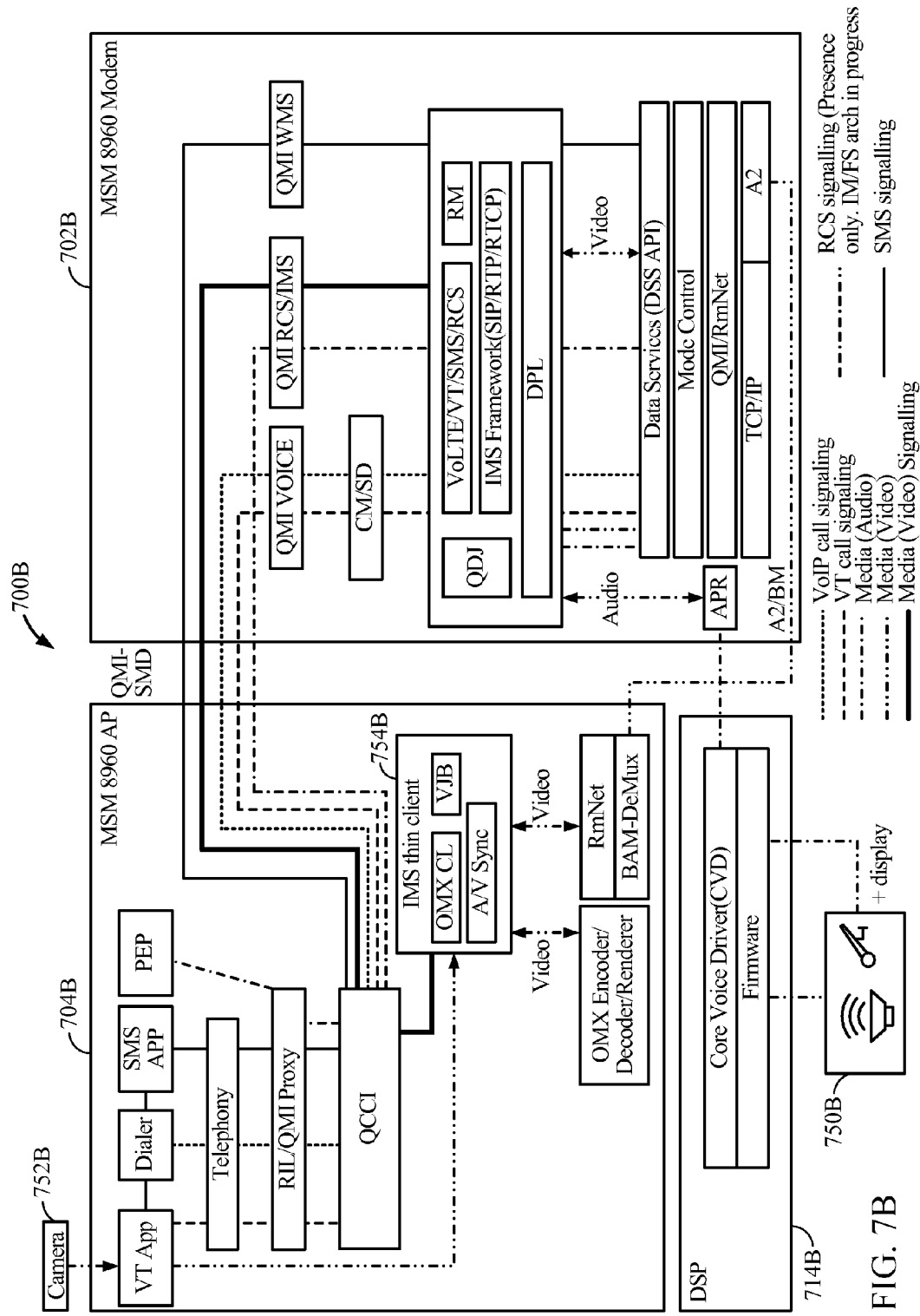
FIG. 7B is a diagram illustrating an example modem employing a hybrid IMS architecture, in accordance with certain aspects of the present disclosure.

FIG. 7B is a diagram illustrating an example modem 700B employing a hybrid IMS architecture, in accordance with certain aspects of the present disclosure. In some embodiments, voice and SMS services may be initiated and managed by the dialer on AP 704B high-level operating system (HLOS) using the same call flow (e.g., dialer→telephony→RIL→QMI→modem) as used for normal circuit-switched equivalent services. As shown in FIG. 7B, video data, for example from camera 752B, may be handled by the AP 704B (e.g., hosting a video telephony application). A thin client 754B may run on the AP 704B HLOS and interface with available video encoder/decoder services. In certain aspects, there may be a dedicated high-speed link (e.g., A2/BAM) between modem processor 702B and AP 704B for transmitting video frames. Audio data, for example from microphone 50B, may be handled by modem processor 702B. In some embodiments, the audio and video may be synchronized (A/V sync) by the thin client 754B, on AP 704B, with audio timestamp information retrieved from audio real-time protocol (RTP) frames on the modem processor 702B sent to the AP 704B via QMI. A delay coefficient may be used in the A/V sync algorithm to account for delays of transferring video frames between the modem processor 702B and the AP 704B.

According to certain aspects, the evolved hybrid IMS architecture provides the flexibility to selectively upgrade or downgrade from video to voice.

In certain embodiments, the IMS stack may be on the modem processor or application processor. In certain aspects, the IMS stack may be dynamically moved from the modem processor to the application processor or from the application processor to the modem processor.

The evolved hybrid IMS architecture may provide flexibility for filtering between the AP 704 and the modem processor 702. Some services may be added to the AP while others may be on the modem. For example, by adding data-centric non-native IMS services (e.g., instant messaging (IM), video share, image share) on the AP, while retaining radio-rich native IMS services (e.g., VoLTE, VT, single radio voice call continuity (SR-VCC), emergency services (e911), Ut interface) on the modem. In some embodiments, all audio may be on the modem processor, while all video is on the AP.

In certain embodiments, radio related services, such as domain selection, quality of service (QoS), inter-RAT (e.g., packet switched (PS) handover, SR-VCC), e911, and IMS PDN management may be tightly integrated within the modem processor 702.

A modem-centric IMS may have lower power consumption than AP-centric IMS because the AP may always be powered on for the IMS client to support voice traffic on uplink and downlink and may be forced to power collapse during a voice session. A modem-centric IMS may also have lower media latency because media frames bundled in IP packets may go over the LTE/eHRPD stack without incurring inter-processor and AP wakeup latencies. Modem-centric IMS may also have the benefit of operator specific features and customizations which may be easily added and supported across multiple HLOSs. Also, because services/features such as QoS, SR-VCC, e911, and priority services may be tightly integrated to modem SW components, a simpler architecture/interface may be supported. Another benefit of modem-centric IMS is more leverage/re-use of IMS services across multiple HLOSs due to common modem image re-use.

Figure 8:
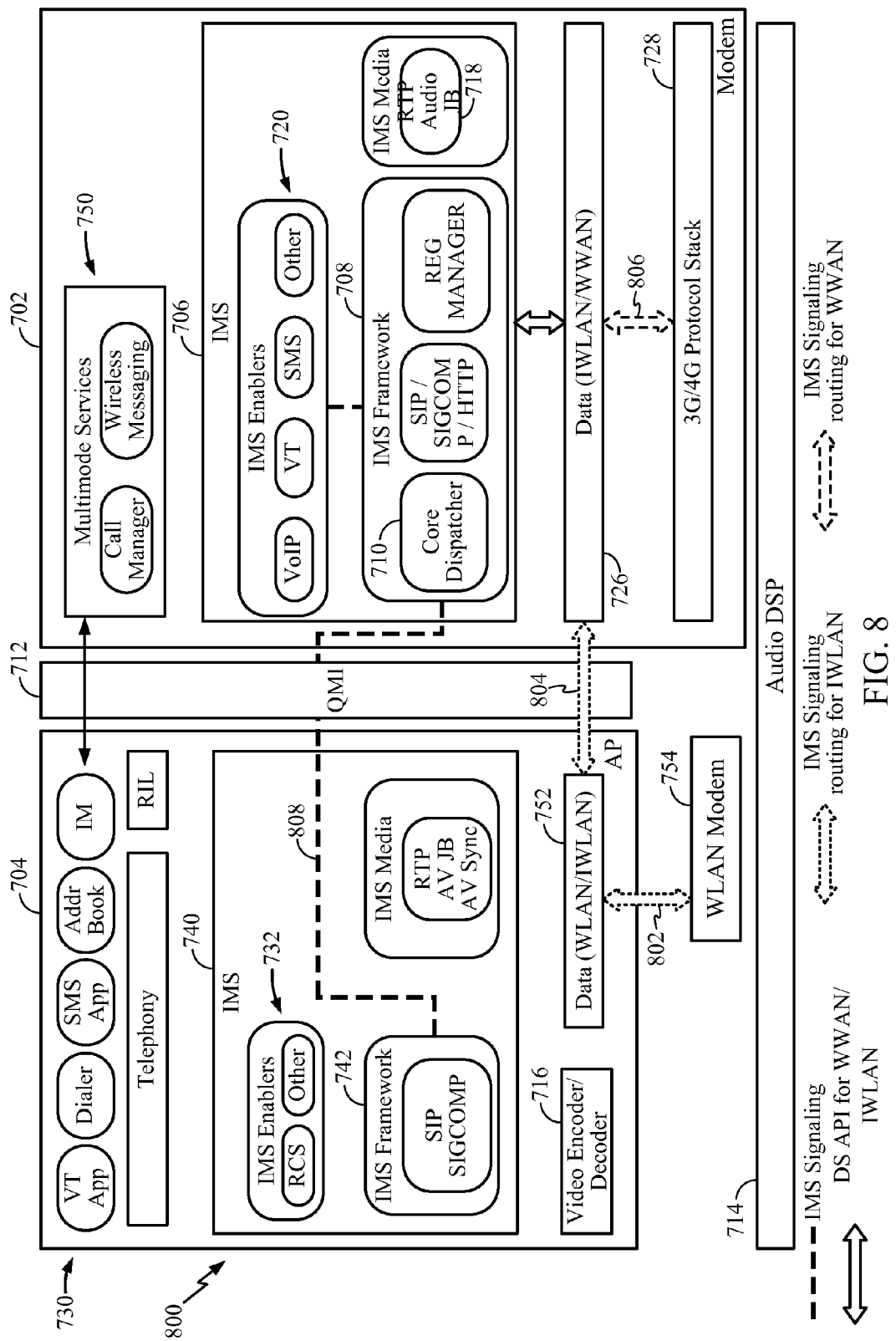
FIG. 8 is a diagram illustrating an example modem employing a hybrid IMS architecture, in accordance with certain aspects of the present disclosure.

FIG. 8 illustrates certain example data and control flows associated with the use of external modem 754 and/or component 752, in accordance with certain aspects of the present disclosure. As shown in FIG. 8, IMS signaling 808 for applications implemented by AP 704 may be directed through common interface (QMI) 712 to core dispatcher 710 and from IMS 708 through protocol handlers 726 and 728 in IMS signaling 806. An application may use a data service provided by protocol handling component 752 which may require or prefer the use of external modem 754, to handle certain WLAN communications, for example. Typically, traffic for data networks supported by modem processor 702 is passed to modem protocol stack handler 726. In some embodiments, modem processor 702 may be configured to support WLAN in addition to IWLAN and WWAN.

Modem processor 702 typically comprises one or more processors configured to manage native services. Modem processor 702 may manage call context, manage handover, call establishment and breakdown, etc. Certain aspects provide an IMS component 706 that may include a core dispatcher 710 and one or more IMS enablers 720. Access to call setup and other core services of the modem processor 702 may be provided through common interface 712. AP services 730 may directly access multimode services 750 of modem processor 702 through interface 712. Certain IMS services 730, 750 and enablers 720, 732 may be provided on AP 704 and/or modem processor 702. IMS frameworks 708 and 742 may include SIP handlers which direct messages and requests through core dispatcher 710, which routes messages and requests request to one or more protocol stacks 726, 728.

Core dispatcher 710 may route data received from IMS enablers 732 when an application chooses a service that is not native to the modem. In one example, the data is routed from IMS framework 742 through interface 712 to IMS framework 708, and through core dispatcher 710 to protocol stacks 726 and/or 728.

In certain embodiments, the architecture may preserve tightly integrated radio coupling for native services within modem processor 702, while providing flexibility to implement a variety of current and future RCS/IMS services on a high level operating system (HLOS) on AP 704 (HLOS/AP). In one example, the architecture may adapt a video framework on HLOS/AP. Inter-stack communication may be provided between IMS frameworks on modem processor 702 and HLOS/AP 704, thereby enabling turn-key end-to-end IMS services for WWAN and IWLAN applications. The use of integrated native services may permit the provision of high performance and power for VoLTE through optimized audio functions 718.

Data communicated using a non-native services and/or protocols may be directed to an application through a common interface 712. Example of services supported include data-centric non-native IMS services such as instant messaging (IM), video sharing, image sharing, etc. Radio-rich native IMS services may be implemented on the modem processor 702, including VoLTE, VT, SMS, SR-VCC, e911, Ut Interface, and so on. Both native and non-native services may be supported by an IMS server and/or framework 706 provided on modem processor 702 and an application processor (AP) 704.

In certain embodiments, radio-related functions such as domain selection, quality of service (QoS), inter-RAT functions (PS Handover/SR-VCC), e911, IMS PDN management, etc., are tightly managed within modem processor 702. Mobility of managed services across WWAN/WLAN can also be made seamless. A centralized call context within modem processor 702 enables PS handoffs for voice/video between WWAN and WLAN.

In certain embodiments, current and future video media frameworks may be implemented and/or ported on AP 704 to enable end-to-end VT services. Audio and video paths for WWAN and WLAN domains can be optimized according to application.

Figure 9:
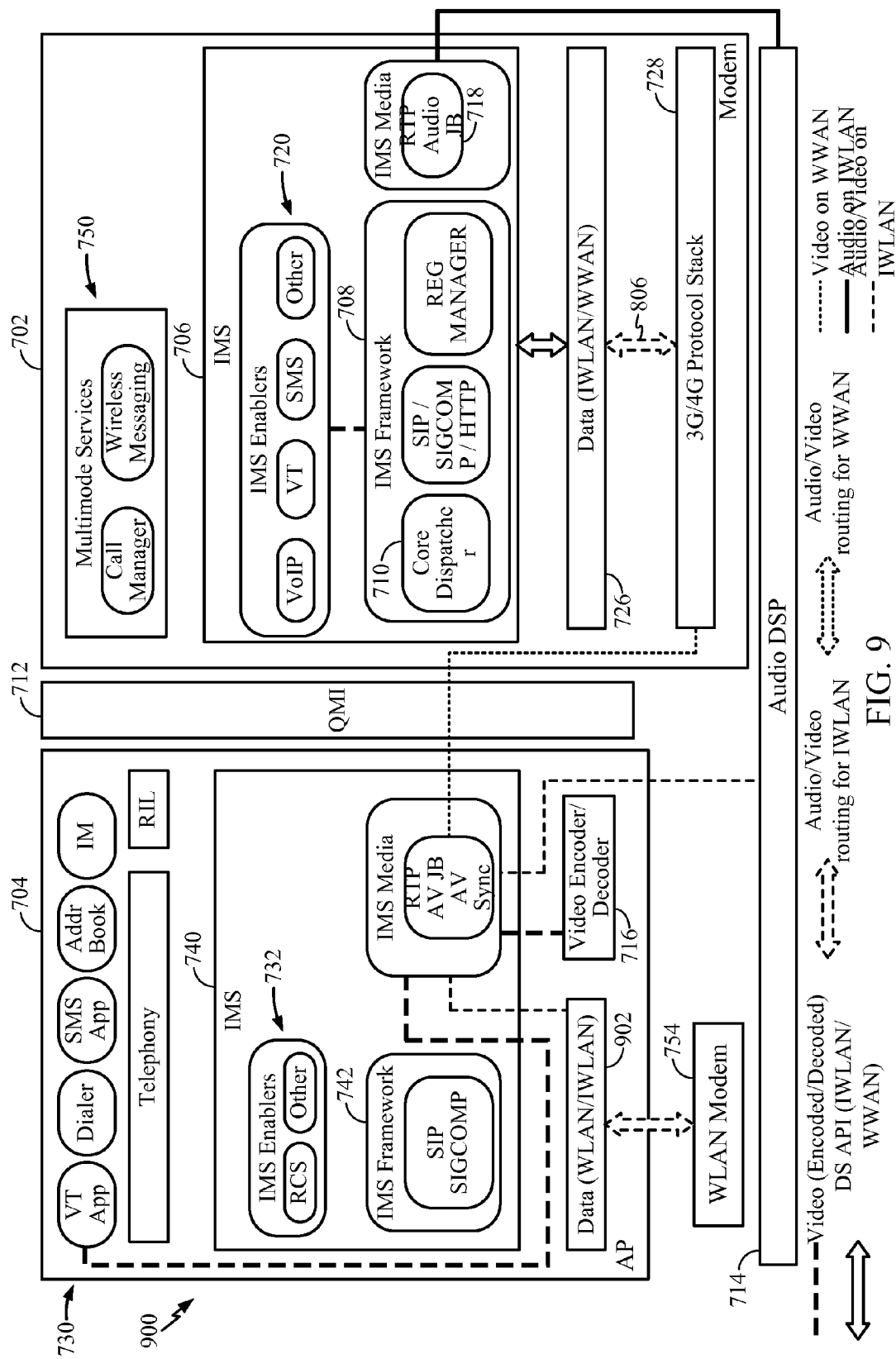
FIG. 9 is a diagram illustrating an example modem employing a hybrid IMS architecture, in accordance with certain aspects of the present disclosure.

FIG. 9 depicts example data paths taken when audio and video connections are established directly by the call manager rather than from an application, in accordance with certain aspects of the present disclosure. Data may be routed directly to and from an audio processor 714 or video processor 716 from a network interface 728 or 902.

Figure 10A:
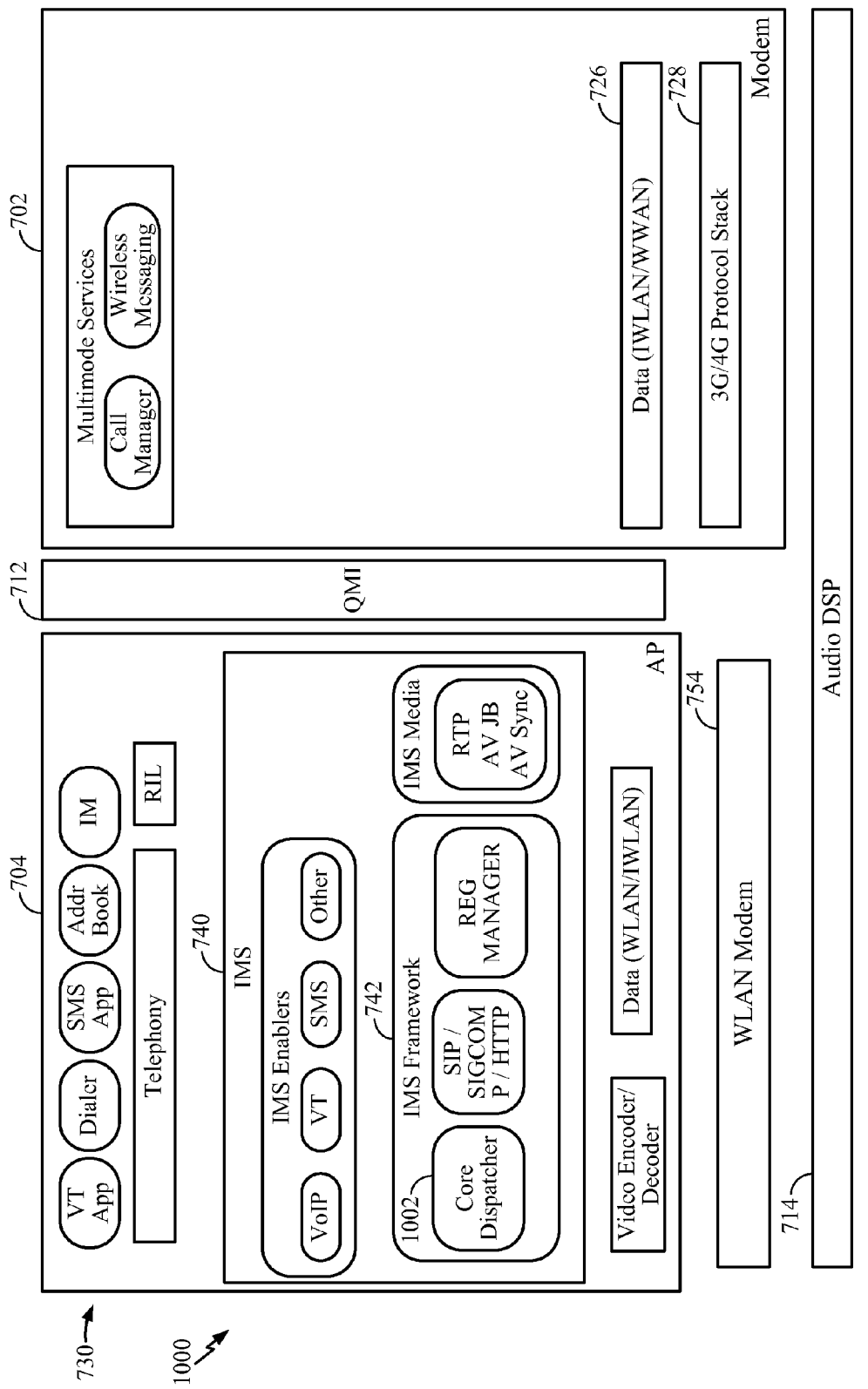
FIG. 10A is a diagram illustrating an example modem employing a hybrid IMS architecture, in accordance with certain aspects of the present disclosure.

FIG. 10A illustrates an example modem configuration 1000 in which the AP 704 operates without using modem services 702 and communicates solely through WLAN modem 754, in accordance with certain aspects of the present disclosure. Here, the IMS 740 of AP 704 may register directly with an IMS server using a single registration and multiple feature tags. IMS framework 742 may include a core dispatcher 1002 to manage the IMS communications and reduce the number of registrations required.

Figure 10B:
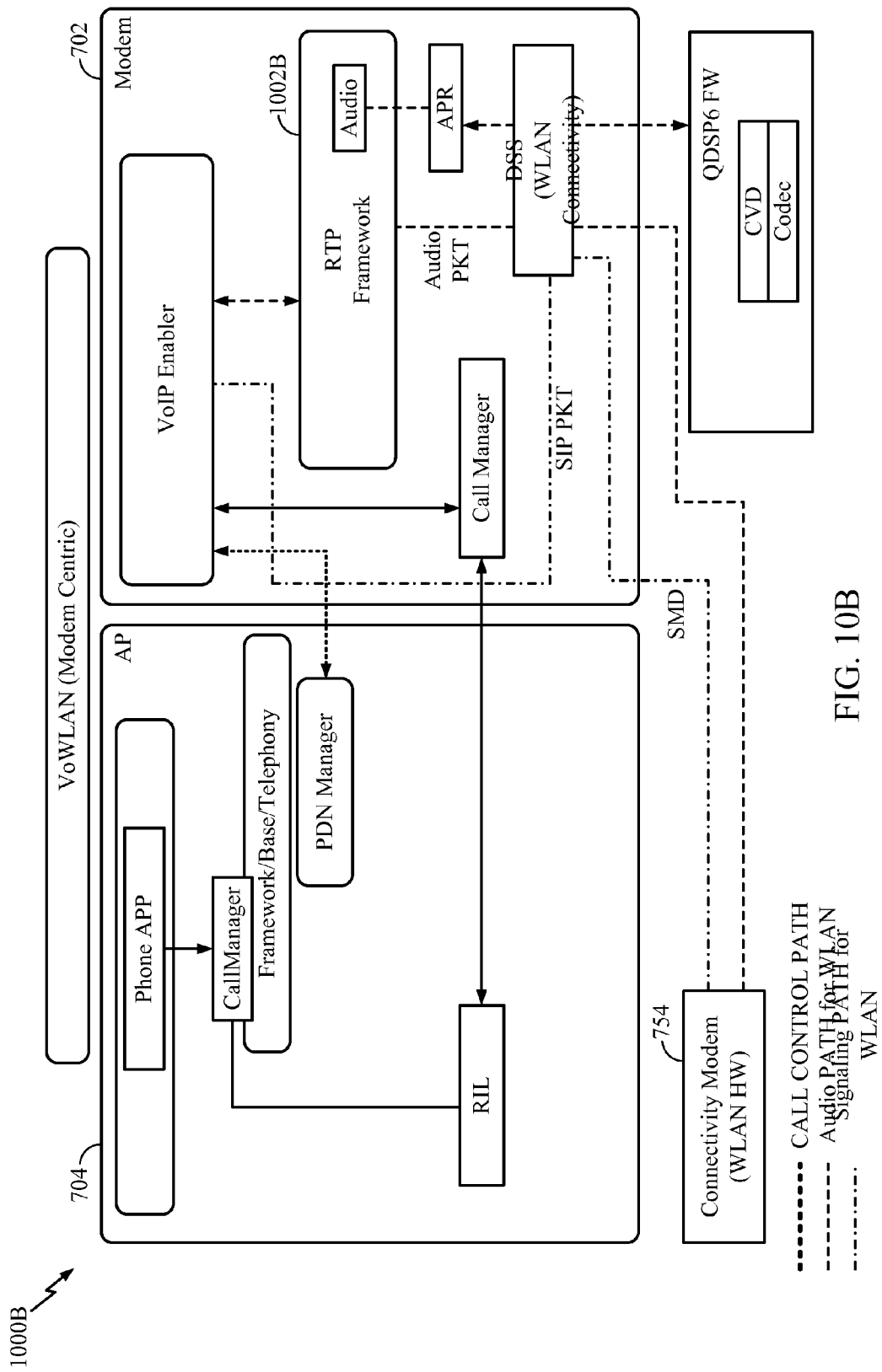
FIG. 10B is a diagram illustrating an example modem employing a hybrid IMS architecture, in accordance with certain aspects of the present disclosure.

FIG. 10B illustrates an example modem configuration 1000B for modem centric voice over WLAN (VoWLAN), in accordance with certain aspects of the present disclosure. As shown in FIG. 10B, the audio path, including the RTP stack 1002B for VoWLAN, is on the modem 702. SIP and Audio packets may be routed to a WLAN interface via a direct interconnect between the modem 702 and the WLAN connectivity modem 754 including the WLAN HW. This may allow access to the WLAN HW without waking up the AP 704 and without power collapse of the AP 704.

In certain aspects, the RTP audio/video path may be AP-centric. For example, the RTP stack 1002B for both Audio and Video may be hosted on AP 704 and a modem proxy RTP stack may control RTP stack 1002B. The modem proxy RTP may route RTP commands to RTP stack 1002B on the AP 704 based on WLAN RAT. This may allow modem 702 to power collapse, once the call setup is done and media starts flowing, in case of WWAN radio idle state.

In certain aspects, IMS WWAN and WLAN may have a two SIP dispatcher architecture. Two parallel SIP dispatchers may be simultaneously hosted on modem 702 and AP 704, respectively. The SIP dispatcher in modem 702 may route all incoming and outgoing SIP packet for WWAN RAT. The SIP dispatcher hosted on AP 704 may route all incoming and outgoing SIP packets over the WLAN interface. This architecture may allow two simultaneous SIP registration contexts to be maintained and to run IMS services on WWAN and WLAN simultaneously. Routing of SIP packets to a particular dispatcher may be based on RAT and service based IMS policy.

Figure 11:
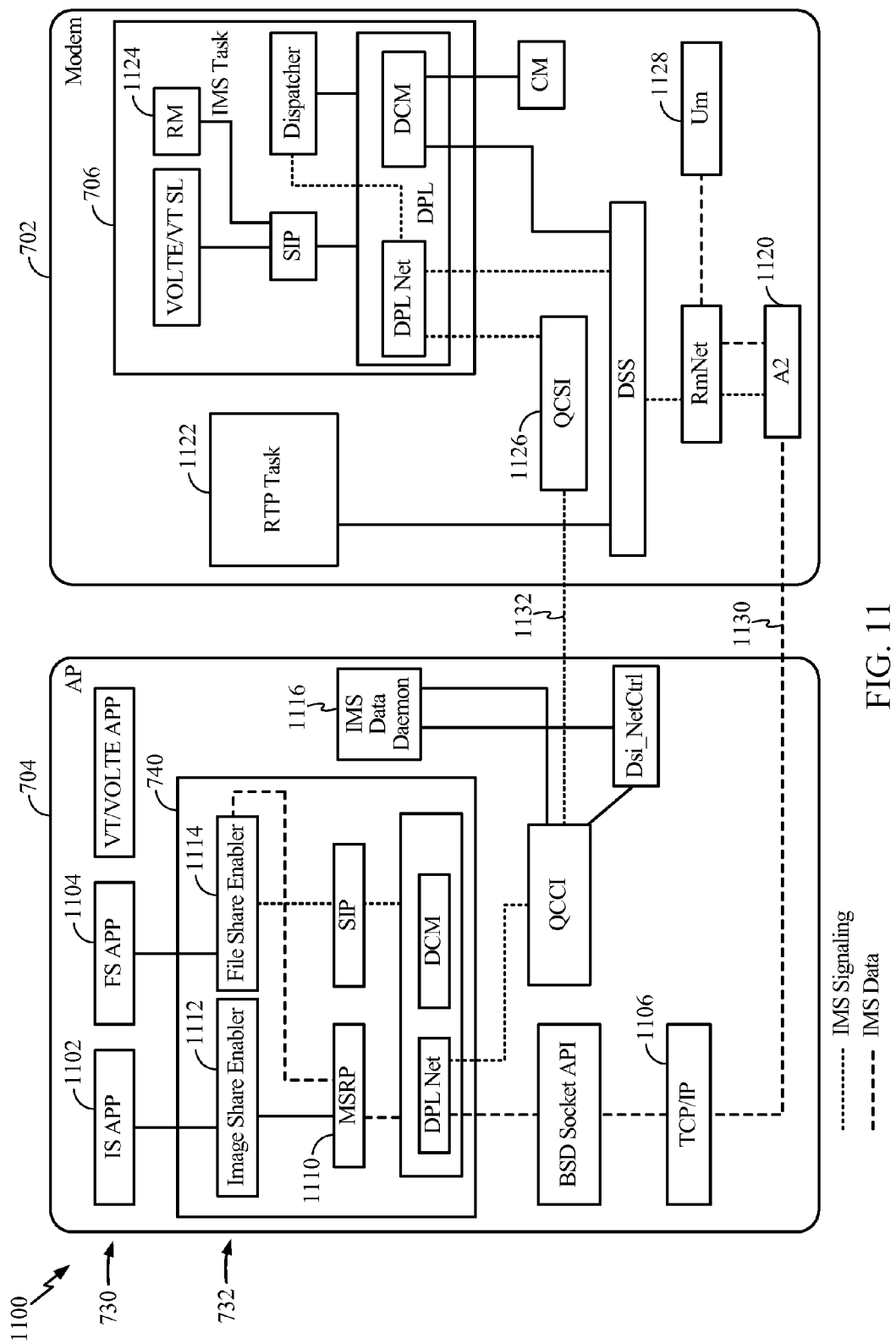
FIG. 11 is a diagram illustrating an example modem employing a hybrid IMS architecture, in accordance with certain aspects of the present disclosure.

FIG. 11 depicts an example in which an IMS data call is established on a WWAN through AP 704, in accordance with certain aspects of the present disclosure. In the example, an IMS registration management entity (RM) 1124 on modem requests establishment of an IMS PDN connection during initialization of modem processor 702. A request for IMS PDN bring-up may trigger a QMI 712 request to an IMS data daemon 1116 instantiated on AP 704 to establish an IMS data call. When the IMS Data call is established, a response indicating the call established may be sent to one or more IMS entities 706 on modem processor 702, which may then open tethered sockets to attach to the IMS PDN.

In certain embodiments, UE 1100 may maintain a single IMS registration and a single IP address for all services, including signaling, media, RCS services, etc. In one example, IMS data daemon 1116 may provide an IPv6 address, which is assigned to AP 704 or one or more components thereof, to modem processor 702 as a QMI 712 request after IMS data daemon 1116 brings up the IMS PDN on AP 704 during boot up or other initialization. The IMS entity 706 of modem processor 702 may then set the IPv6 address as a socket option for the IMS data stack on modem processor 702.

Figure 12:
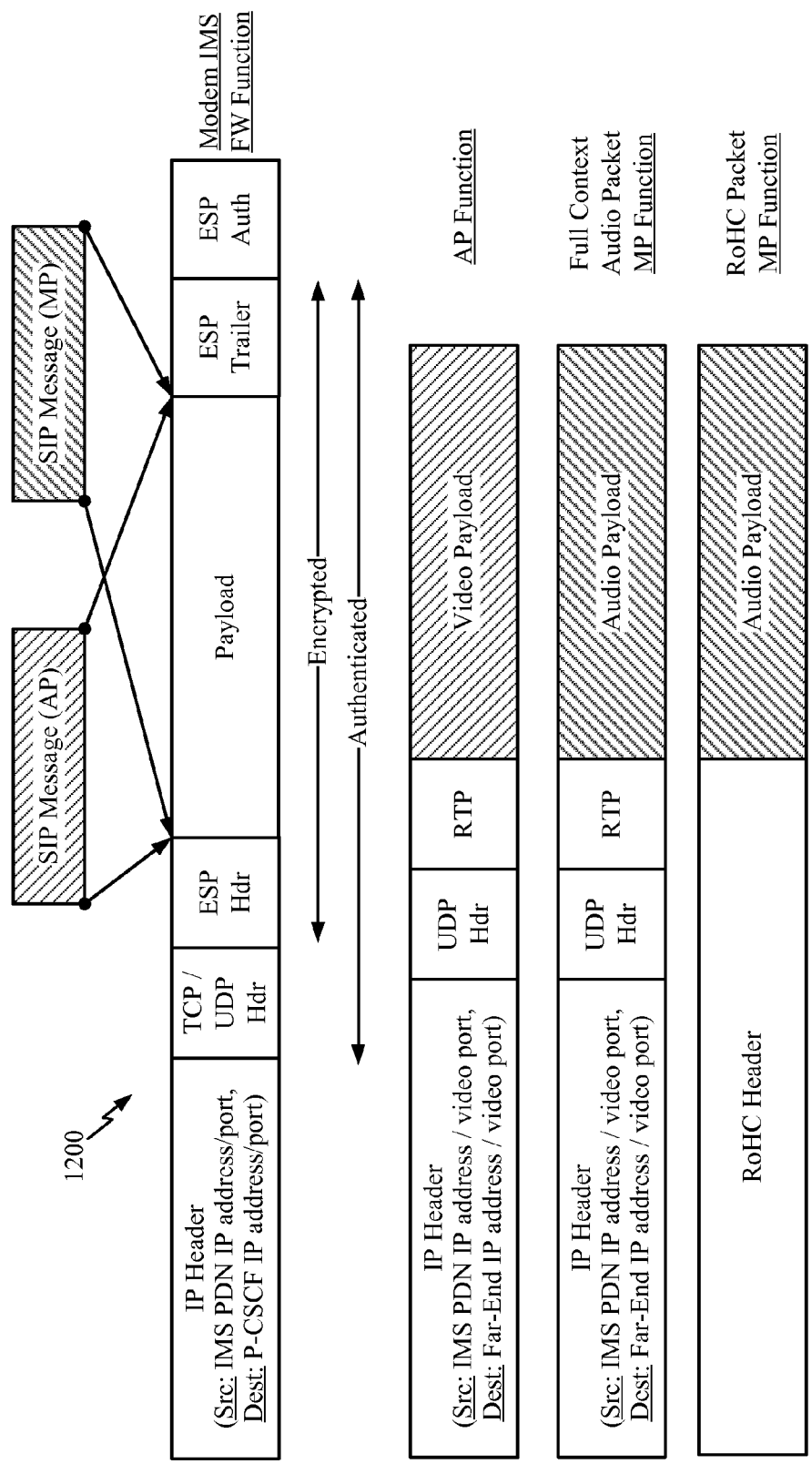
FIG. 12 is a diagram illustrating example data packets transmitted by a modem employing a hybrid IMS architecture, in accordance with certain aspects of the present disclosure.
Figure 13:
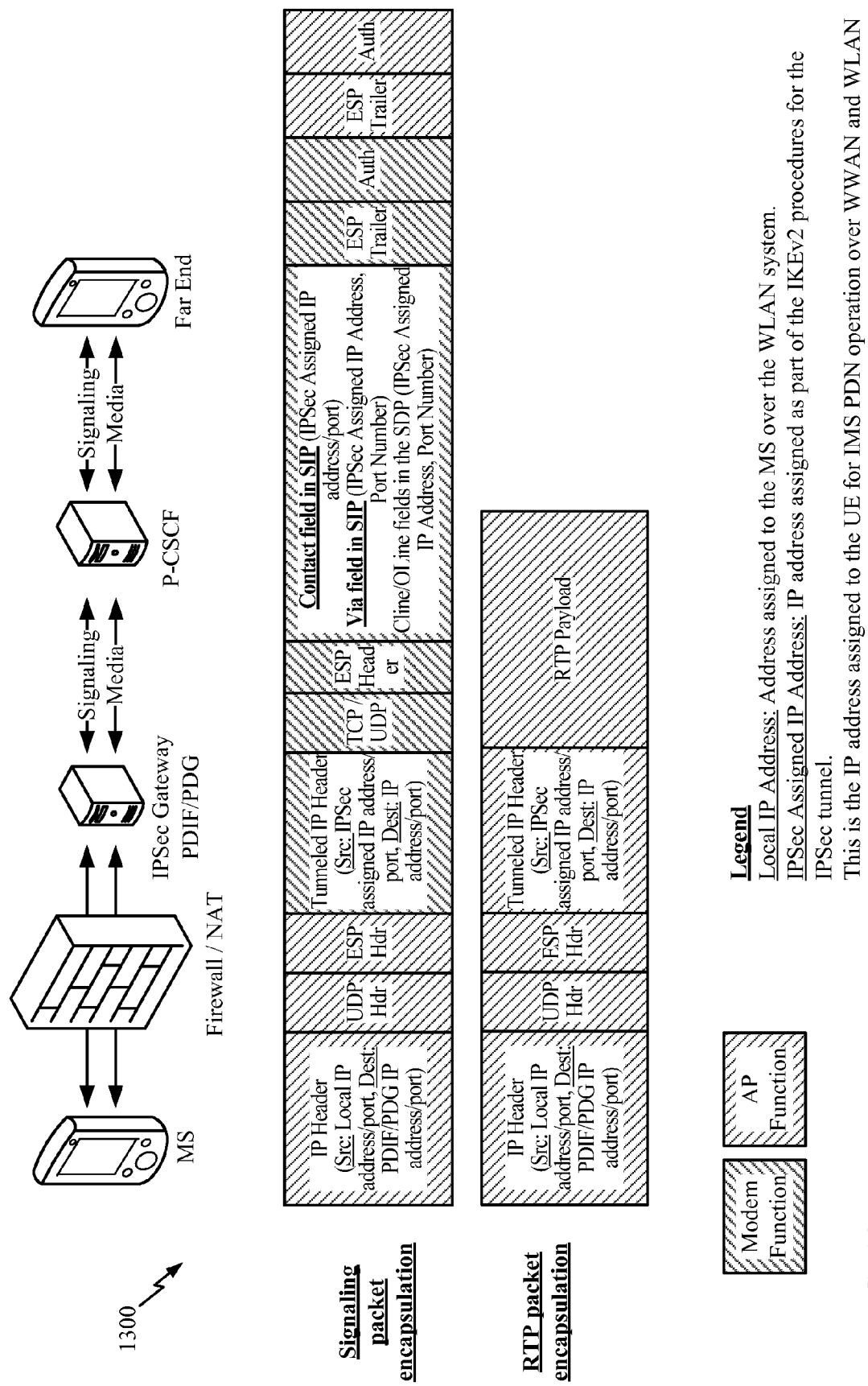
FIG. 13 is a diagram illustrating example data packets transmitted by a modem employing a hybrid IMS architecture.

FIGS. 12 and 13 illustrate example construction of data packets used in the hybrid IMS system and identify example components responsible for creating elements of the packets, in accordance with certain aspects of the present disclosure. As shown in the packets 1200 illustrated in FIG. 12, both modem processor 702 and AP 704 can provide payloads 1202 for packets transmitted by UE 700. FIG. 13 is a schematic 1300 that shows division of responsibilities of the modem processor 702 and AP 704 where external modem 754 is used, for example. In particular, modem processor 702 may be used to prepare payload and provide tunneling headers for IMS services supported by AP 704 or modem processor 702. In the example depicted, AP 704 provides IP encapsulation for tunneled payloads. Additionally, AP 704 may manage tunneling (payload and encapsulation) as well as IP encapsulation for applications and services supported entirely on AP 704, including for example, RTP related applications and services.

Figure 14:
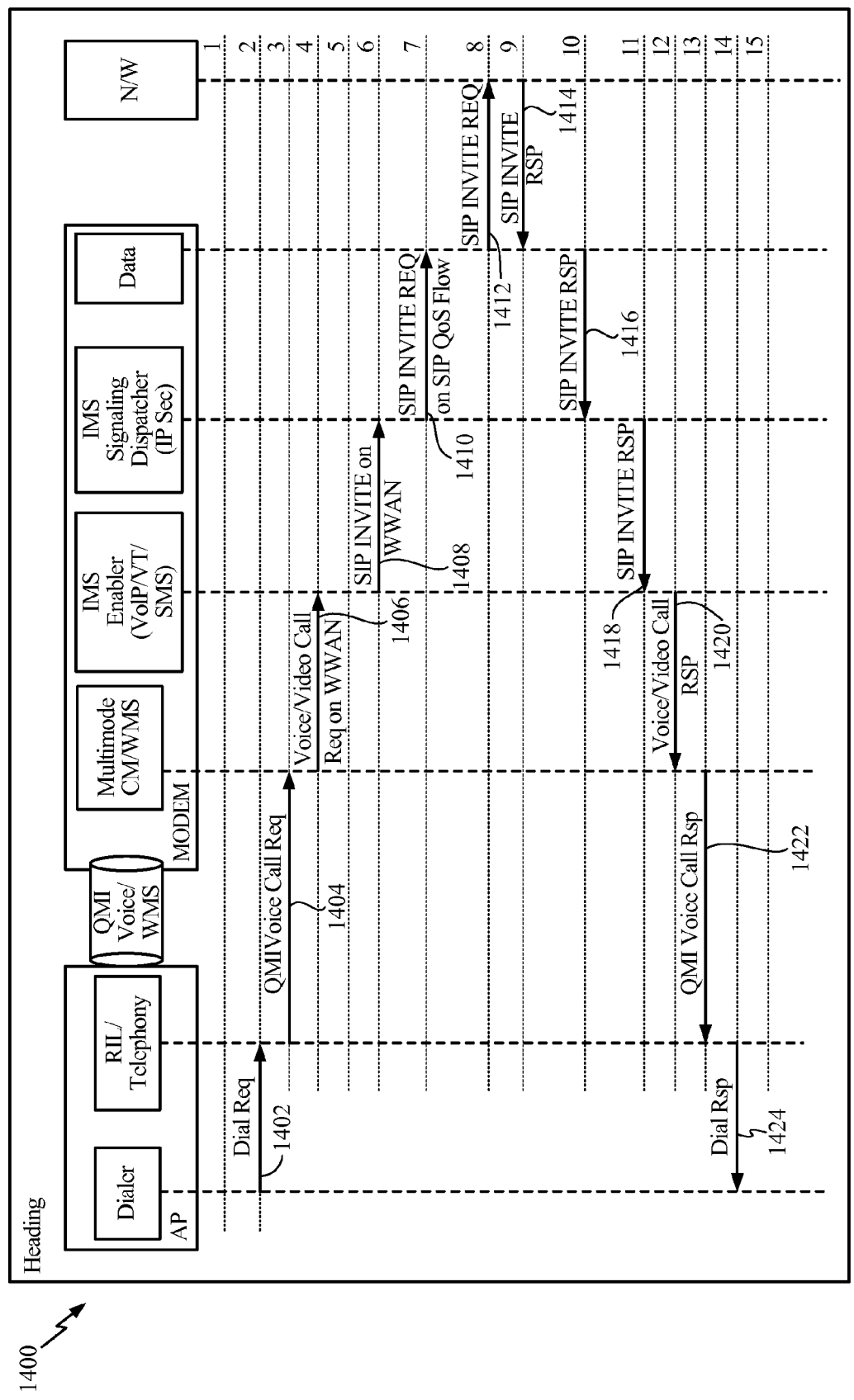
FIG. 14 is an example call flow diagram for a method of wireless communication, in accordance with certain aspects of the present disclosure.

FIG. 14 is an example call flow diagram illustrating a voice or video call setup procedure performed using a modem processor 702 having an evolved hybrid IMS architecture, in accordance with certain aspects of the present disclosure. Dialer in AP 704 may request a call at 1402. A radio interface layer (RIL) of the HLOS may send a QMI call request 1404 through interface 712 to call manager provided in multimode services 750 of modem processor 702. Call manager may send a request 1406 for voice or video call setup to an appropriate one or more IMS enablers 720, which causes an SIP invite to be issued at 1408 through dispatcher 710 of IMS framework 708 and at 1410 data network handler 726 to the network 1412. The response 1414 from the network may be relayed at 1416 to the dispatcher 710 and on to IMS enabler 720 at 1418. The response to the voice or video call response 1420 is sent to call manager in multimode services 750 and a response 1422 is transmitted through interface 712 to RIL which responds at 1424 to dialer.

Figure 15:
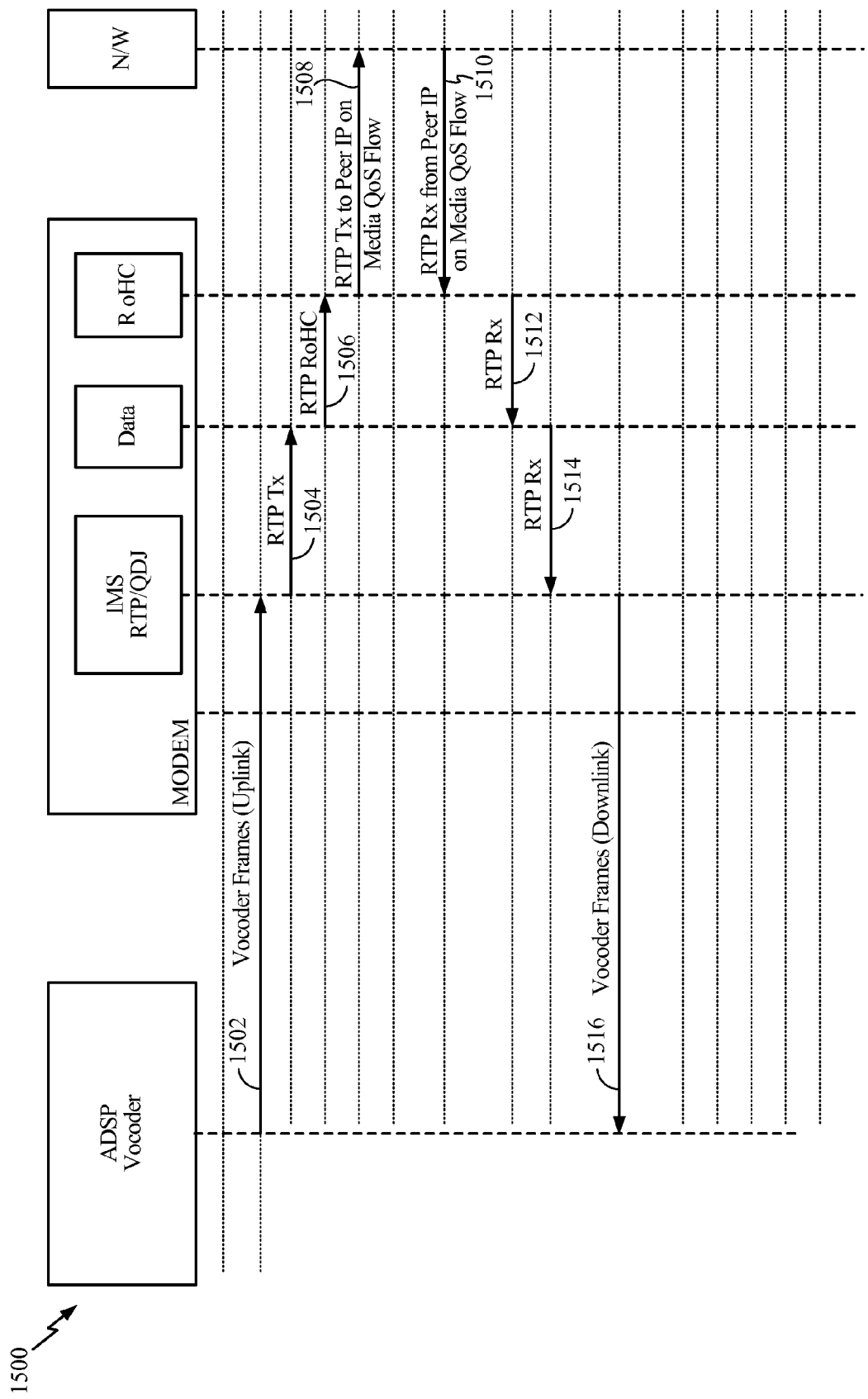
FIG. 15 is an example call flow diagram for a method of wireless communication, in accordance with certain aspects of the present disclosure.

During a call, as shown in the call flow diagram of FIG. 15, a voice coder (vocoder) may send uplink frames 1502 through an IMS media handler of IMS 740 on the AP 704 may transmit the packets 1504 using a real-time protocol (RTP) that is transferred through the modem processor 702 at 1506 and 1508 to a peer system, which is another party to the call, typically using a connection in which quality-of-service (QoS) is managed. RTP data 1510 received from peer system is transmitted 1512 and 1514 to the IMS 740 of AP 704 where RTP headers are removed and frames 1516 are sent to the vocoder.

Figure 16:
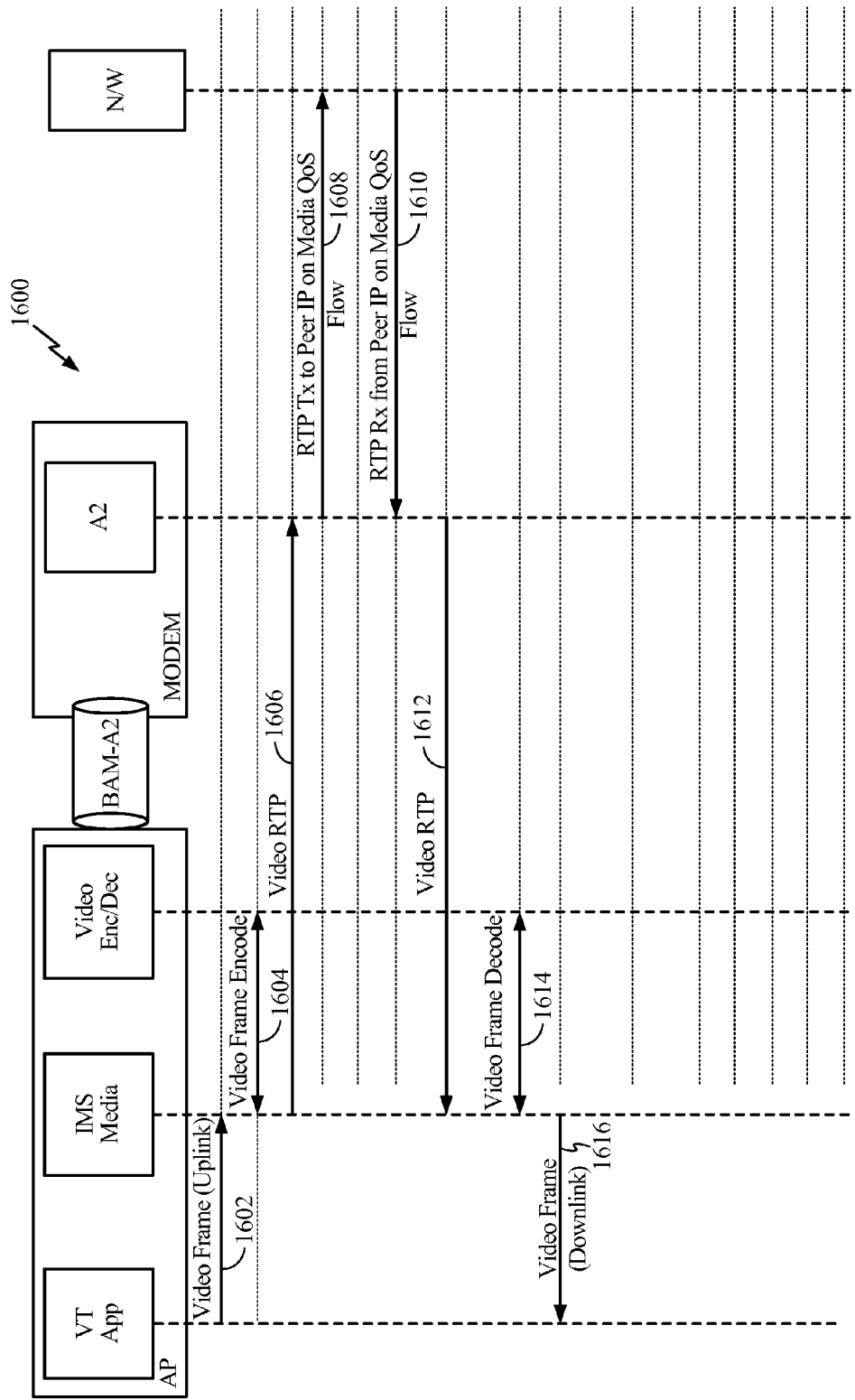
FIG. 16 is an example call flow diagram for a method of wireless communication, in accordance with certain aspects of the present disclosure.

FIG. 16 illustrates example data flow during video call, in accordance with certain aspects of the present disclosure. A video telephony application may exchange frames 1602 and 1616 with IMS handler 732 which interacts 1604 and 1614 with a video encoder to generate and decode video RTP packets 1606 and 1612 which are exchanged with modem processor 702 for communication 1608 and 1610 over the network.

Figure 17:
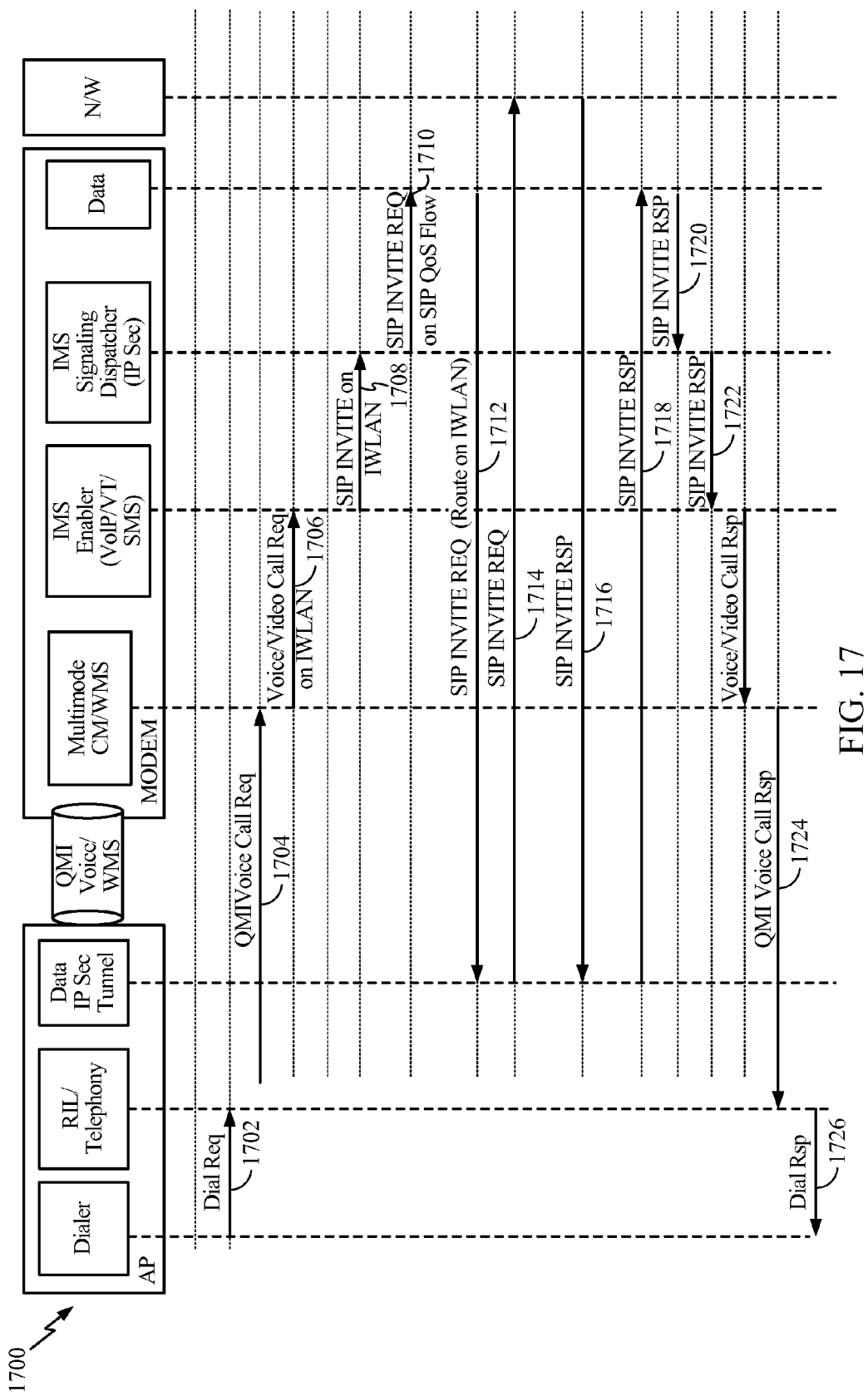
FIG. 17 is an example call flow diagram for a method of wireless communication.

FIG. 17 is an example call flow diagram illustrating a voice or video call setup procedure performed using a modem processor 702 having an evolved hybrid IMS architecture but transmitted using an IPSec tunneling protocol, in accordance with certain aspects of the present disclosure. Dialer in AP 704 requests a call at 1702. RIL may send a QMI call request 1704 through interface 712 to call manager provided in multimode services 750 of modem processor 702. Call manager sends a request 1706 for voice or video call setup to an appropriate one or more IMS enablers 720 which causes an SIP invite to be issued at 1708 through dispatcher 710 of IMS framework 708 and at 1710 data network handler 726. The SIP request 1712 may be routed to the network through IPSec supported by AP 704. Request 1712 is sent through interface 712 and IPSec encapsulated and/or encrypted SIP request 1714 is forwarded to the network. The response 1716 from the network is relayed is passed through IPSec module of AP 704 and returned to modem processor 702 through interface 712 at 1718, to the dispatcher 710 at 1720 and on to IMS enabler 720 at 1722. The response to the voice or video call response 1724 is sent to call manager in multimode services 750 and a response 1726 is transmitted through interface 712 to RIL which responds at 1728 to dialer.

Figure 18:
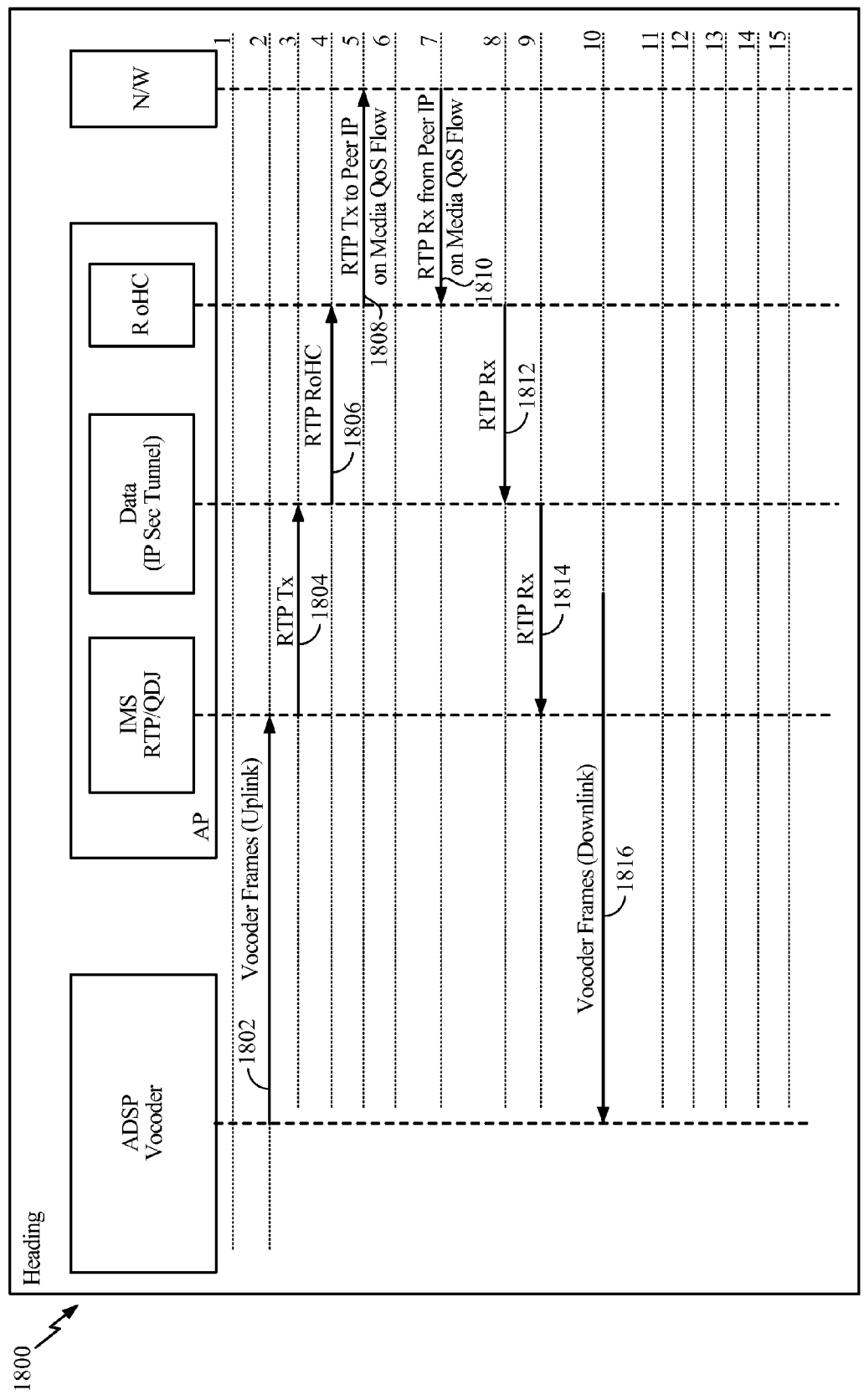
FIG. 18 is an example call flow diagram for a method of wireless communication, in accordance with certain aspects of the present disclosure.
Figure 19:
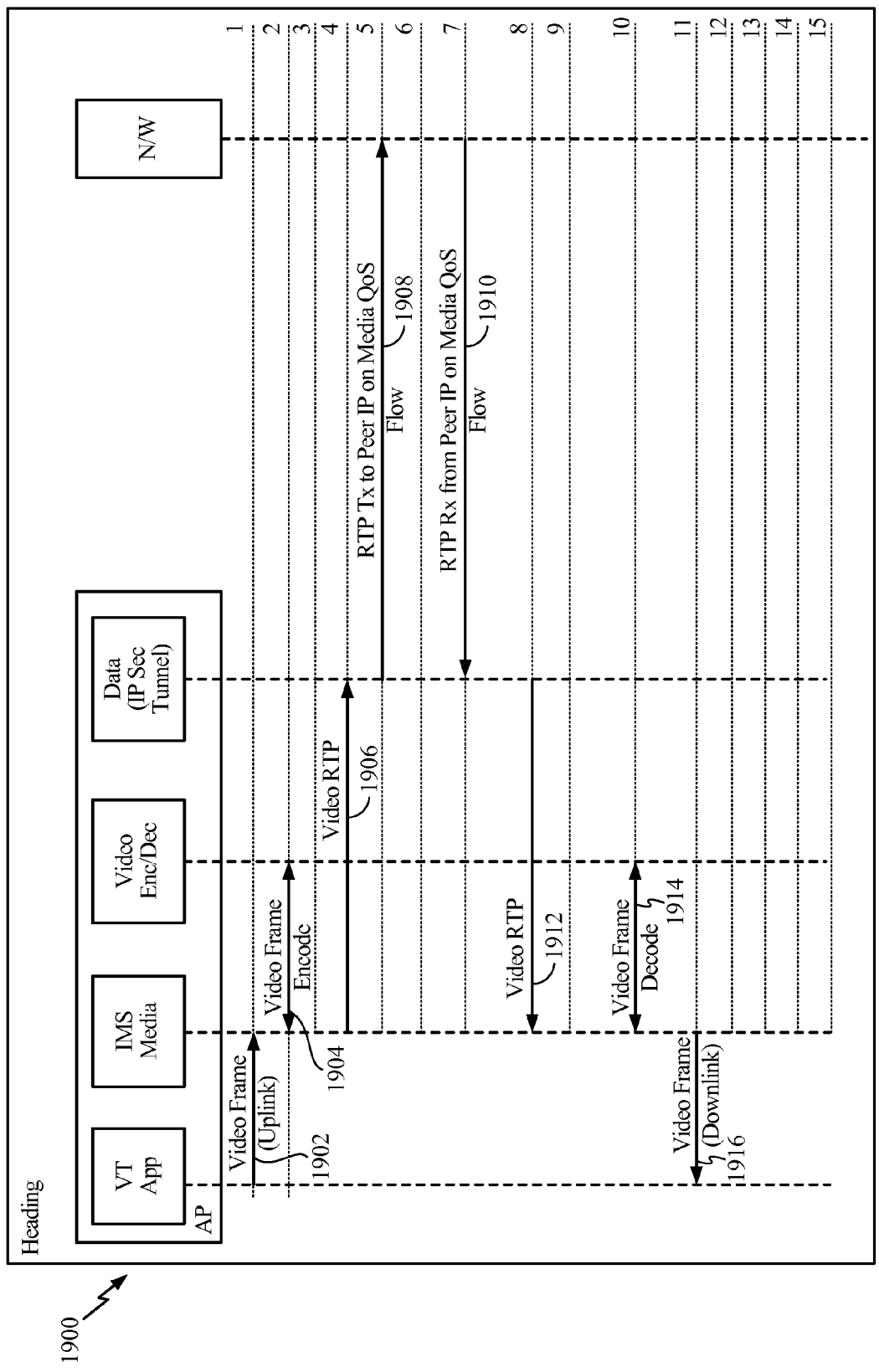
FIG. 19 is an example call flow diagram for a method of wireless communication, in accordance with certain aspects of the present disclosure.

FIGS. 18 and 19 are example call flow diagrams illustrating data exchange in voice and video calls, respectively, when the call is handled through IPSec, in accordance with certain aspects of the present disclosure. Here data flow may be confined to the AP 704 and packets can be transmitted to the network using external or internal modem as appropriate.

Figure 20:
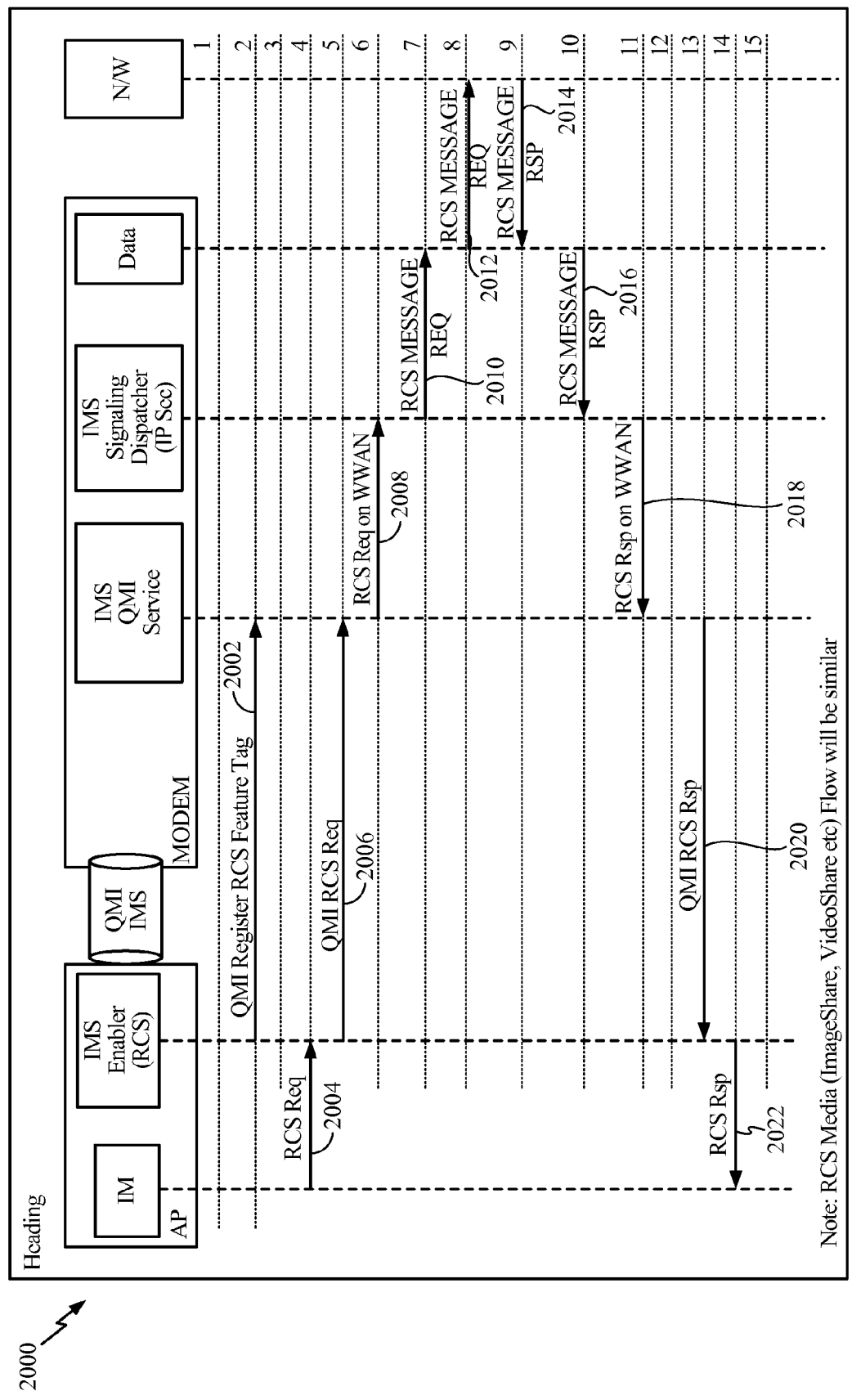
FIG. 20 is an example call flow diagram for a method of wireless communication, in accordance with certain aspects of the present disclosure.

FIG. 20 is an example call flow diagram illustrating a registration process for IMS, in accordance with certain aspects of the present disclosure. In this example, modem processor 702 may register a plurality of services by sending requests to an IMS service using feature tags 2002 to identify each registered native and non-native feature. The feature tags may be generated or identified by an IMS enabler 732 of AP 704. Thereafter, an RCS request 2004 from a application 730 (here an instant message (IM) application) may be sent through interface 712 to IMS 706 of modem processor 702 and forwarded 2008, 2010, 2012 through dispatcher 710, protocol handlers 726 and 728 to the network. Response 2014 from the network is provided 2016, 2018, and 2020 through dispatcher 710, IMS framework 708 and interface 712 to an appropriate IMS enabler 732 of AP 702. From IMS enabler 732, data is provided to the IM application.

Figure 21:
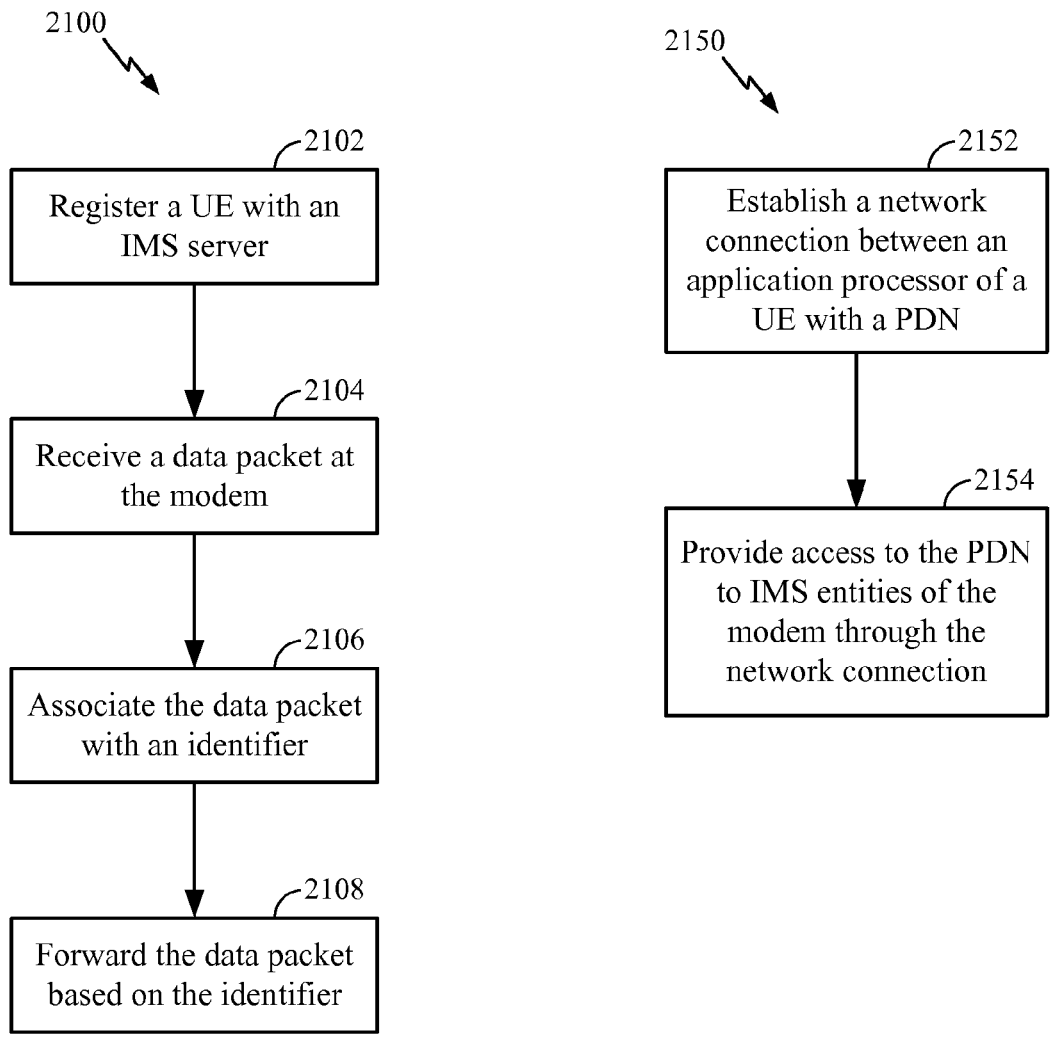
FIG. 21 illustrates example operations for wireless communication, in accordance with certain aspects of the present disclosure.

FIG. 21 illustrates example operations 2100 for wireless communication, in accordance with certain aspects of the present disclosure. The operations 2100 may be performed by a UE 700 and, in particular by a modem processor 702 and/or applications processor 704 of UE 700. UE 700 may comprise an AP 704 configured to provide at least one non-native service and modem processor 702 to perform native services. Non-native services may include an RCS service.

At step 2102, UE 700 registers with an IMS server. Registering the UE 700 may include registering one or more native services provided by a modem processor 702 of the UE 700 and at least one non-native service that is not provided by the modem processor 702. Registering the one or more native services may include registering each of the native services with a feature tag. Registering the at least one non-native service includes registering each of the non-native services with a feature tag. The identifier may correspond to the feature tag associated with one of the native or non-native services.

At step 2104, UE 700 receives a data packet at the modem processor 702. The data packet may be received from AP 704. AP 704 may comprise an IMS enabler and the data packet is provided by the IMS enabler. The data packet may be received from a WWAN. The data packet may be received from an interworking WLAN. In some embodiments, the UE 700 comprises a second modem that communicates with a WLAN and the data packet may be received from the second modem.

At step 2106, UE 700 may associate the data packet with an identifier. The data packet may include the identifier, which may identify one of the native or non-native services. The identifier may comprise a feature tag that identifies an IMS service and/or that is registered by UE 700. In some embodiment, the identifier may comprises a communications port, socket, session or other identifier that can be used to identify an IMS service provided by the modem processor 702 or AP 704. In some embodiments, the identifier may be added to the payload or to a header in order to support identification of the IMS service by UE 700 or a network entity.

At step 2108, UE 700 forwards the data packet based on the identifier.

In certain embodiments, the AP 704 is configured to generate IMS requests related to the non-native services. IMS requests related to the non-native services may be sent to a network through an IMS framework of the modem. The IMS framework of the modem may comprise a dispatcher that forwards the IMS requests related to the non-native services to the network. The dispatcher may forward the IMS requests related to the non-native services to the network through a network connection maintained by the modem. The dispatcher may forward the IMS requests related to the non-native services to the network through a network connection maintained by a different modem, such as external modem 754.

The AP 704 may be configured to host one or more applications that use the one or more native services. The applications may communicate with the one or more native services through an interface between the application processor and the modem. The one or more native services used by the one or more applications may generate IMS requests on behalf of the one or more applications.

In certain embodiments, the modem processor 702 comprises a dispatcher that forwards the IMS requests generated on behalf of the one or more applications to a network. The dispatcher may forward IMS requests generated by the application processor to a network. The dispatcher may forward the IMS requests generated on behalf of the one or more applications and the IMS requests generated by the application processor to the network through a network connection maintained by the modem.

In certain embodiments, the dispatcher forwards the IMS requests generated on behalf of the one or more applications and the IMS requests generated by the application processor to the network through a network connection maintained by a different modem.

FIG. 21 illustrates example operations 2150 for wireless communication, in accordance with certain aspects of the present disclosure. The operations 2150 may be performed by a UE 700 and, in particular by a modem processor 702 and/or applications processor 704 of UE 700. UE 700 may comprise an AP 704 configured to provide at least one non-native service and modem processor 702 to perform native services. Non-native services may include an RCS service.

At step 2152, the AP 704 may establish a network connection between AP 704 with a PDN. The network connection may be established in response to a request from an IMS entity 706 of modem processor 702.

At step 2154, one or more IMS entities 706 of the modem processor 702 are provided access to the PDN through the network connection. Access to the PDN may be provided to one or more IMS entities by opening tethered sockets to attach the one or more IMS entities. Access to the PDN may be provided to one or more IMS entities by providing an IP address of the AP 704 to the modem. The modem may use the IP address for communicating with the PDN. An IMS entity 704 of the modem processor 702 may set the IP address as a socket option for a data stack of the modem processor 702. The IP address may be used for communications between the AP 704 and the PDN. The IP address may be used for communications between the modem processor 702 and the PDN.

Figure 22:
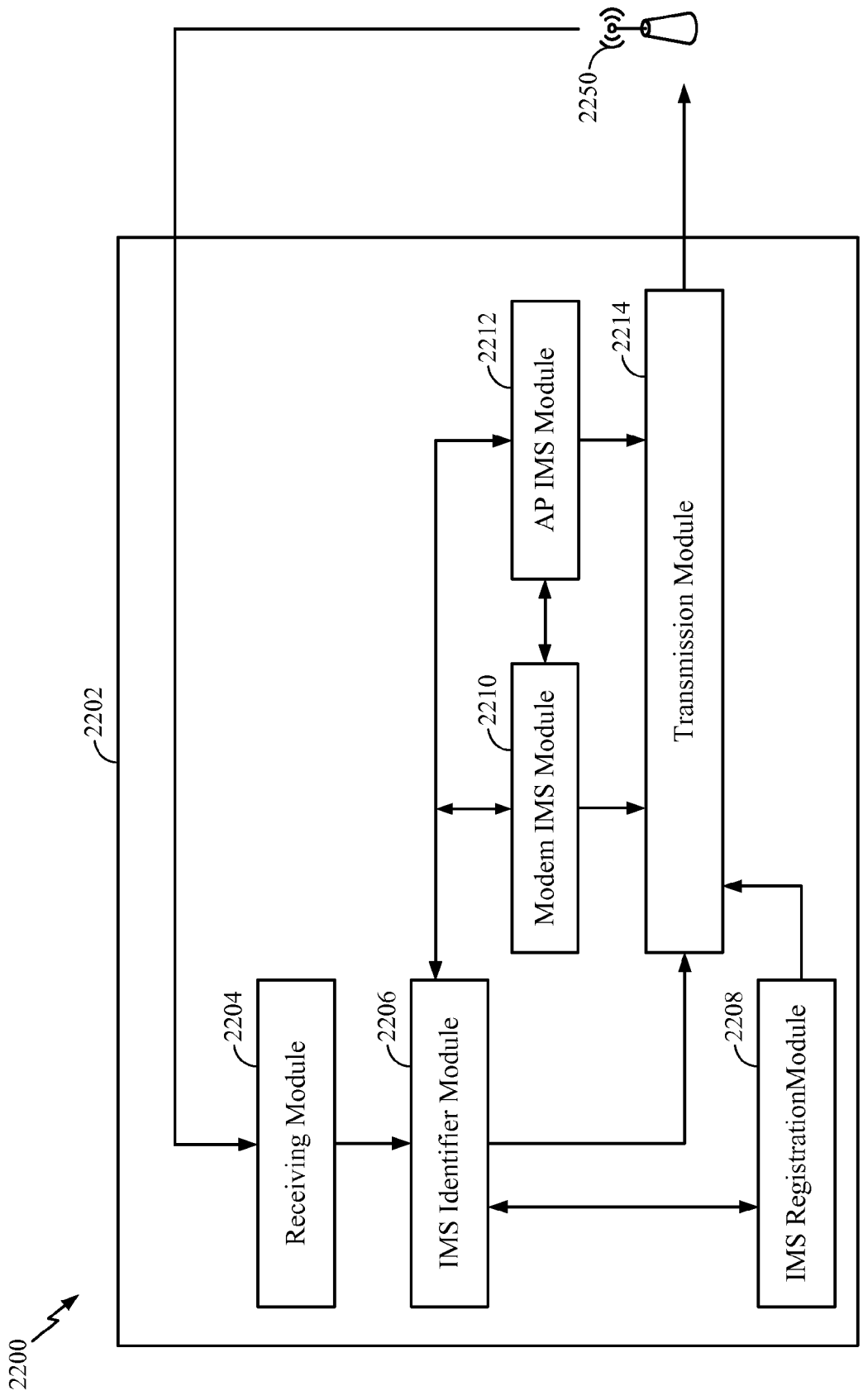
FIG. 22 is a conceptual data flow diagram illustrating the data flow between different modules/means/components in an exemplary apparatus, in accordance with certain aspects of the present disclosure.

FIG. 22 is a conceptual data flow diagram 2200 illustrating example data flow between different modules/means/components in an exemplary apparatus 2202, in accordance with certain aspects of the present disclosure. The apparatus may be a UE 700. The apparatus includes a receiving module 2204 that receives data from a network. Module 2204 may be embodied in one or more of modem processor 702, AP 704 and external modem 754. The apparatus includes an IMS identifier module 2206 that identifies one or more IMS services associated with the data packet and directs the packet accordingly. The apparatus includes a module 2208 that manages IMS registration for the UE 700. The apparatus includes an IMS module 2210 that provides an IMS entity on modem processor 702. The apparatus includes an IMS module 2212 that provides or supports an IMS entity on AP 704. The apparatus includes a transmission module 2214 that handles communications between UE 700 and one or more networks, including wireless networks accessible through a base station 2250, or the like.

The apparatus may include additional modules that perform each of the steps of the algorithm in the aforementioned flow charts of FIG. 20. As such, each step in the aforementioned flow charts of FIG. 20 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 23:
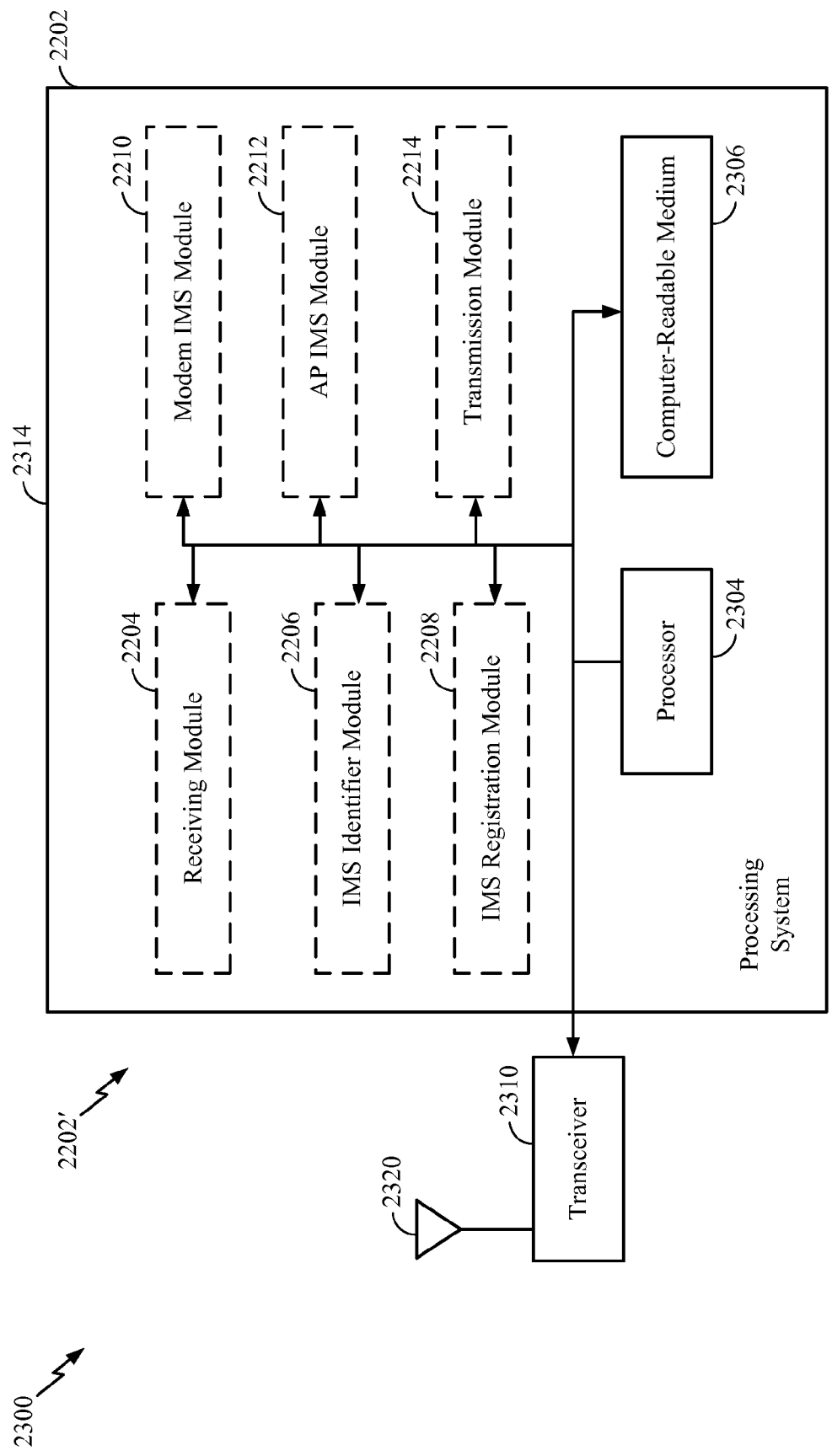
FIG. 23 is a diagram illustrating an example of a hardware implementation for an apparatus employing a processing system, in accordance with certain aspects of the present disclosure.

FIG. 23 is a diagram 2300 illustrating an example of a hardware implementation for an apparatus 2202' employing a processing system 2314, in accordance with certain aspects of the present disclosure. The processing system 2314 may be implemented with a bus architecture, represented generally by the bus 2324. The bus 2324 may include any number of interconnecting buses and bridges depending on the specific application of the processing system 2314 and the overall design constraints. The bus 2324 links together various circuits including one or more processors and/or hardware modules, represented by the processor 2304, the modules 2204, 2206, 2208, 2210, 2212, 2214, and the computer-readable medium 2306. The bus 2324 may also link various other circuits such as timing sources, peripherals, voltage regulators, and power management circuits, which are well known in the art, and therefore, will not be described any further.

The processing system 2314 may be coupled to a transceiver 2310. The transceiver 2310 is coupled to one or more antennas 2320. The transceiver 2310 provides a means for communicating with various other apparatus over a transmission medium. The processing system 2314 includes a processor 2304 coupled to a computer-readable medium 2306. The processor 2304 is responsible for general processing, including the execution of software stored on the computer-readable medium 2306. The software, when executed by the processor 2304, causes the processing system 2314 to perform the various functions described supra for any particular apparatus. The computer-readable medium 2306 may also be used for storing data that is manipulated by the processor 2304 when executing software. The processing system further includes at least one of the modules 2204, 2206, 2208, 2210, 2212, and 2214. The modules may be software modules running in the processor 2304, resident/stored in the computer readable medium 2306, one or more hardware modules coupled to the processor 2304, or some combination thereof. The processing system 2314 may be a component of the UE 650 and may include the memory 660 and/or at least one of the TX processor 668, the RX processor 656, and the controller/processor 659.

In one configuration, the apparatus 2202/2202' for wireless communication includes means 2208 for registering a UE 700 at an IMS server, means (including means 2204) for receiving a data packet at the modem processor 702, means 2206 for managing identifier associated with one of a native or non-native service and provided with data packets, means (including means 2214) for forwarding the data packet based on the identifier, means 2210 and 2212 for providing and managing IMS services in a modem processor 702 and AP 704, respectively.

Means 2214 for transmission may also be for establishing a network connection between AP 704 of the UE 700 with a PDN. Means 2206, 2208, 2210 and 2212 may cooperate to provide access to the PDN to one or more IMS entities of the modem processor 702 and/or AP 704 through the network connection.

The aforementioned means may be one or more of the aforementioned modules of the apparatus 2202 and/or the processing system 2314 of the apparatus 2202' configured to perform the functions recited by the aforementioned means. As described supra, the processing system 2314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 24:
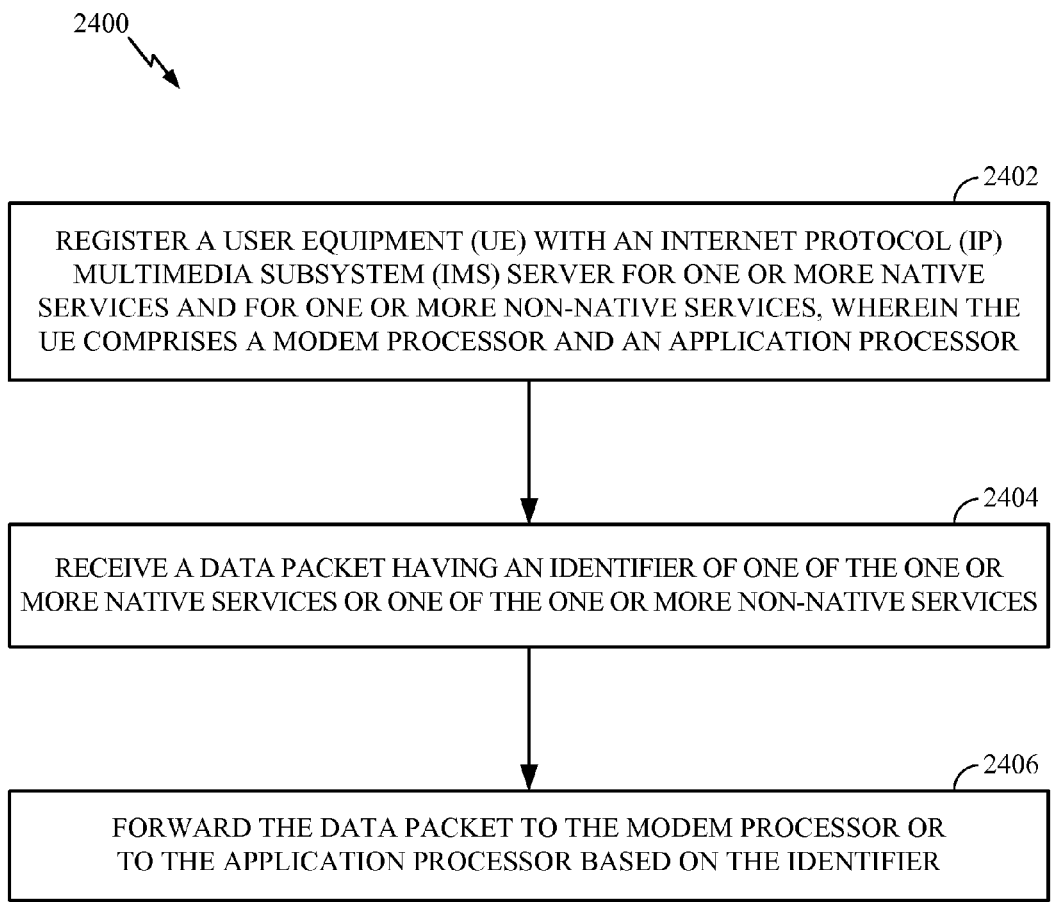
FIG. 24 illustrates example operations for wireless communication, in accordance with certain aspects of the present disclosure.

FIG. 24 illustrates example operations for wireless communication, in accordance with certain aspects of the present disclosure. The operations may be performed, for example, by a user equipment (e.g., UE 650). The operations may begin at 2402 by registering the UE with an internet protocol (IP) multimedia subsystem (IMS) server for one or more native services and for one or more non-native services, wherein the UE comprises a modem processor and an application processor. Native services may include radio-coupled services such as VoLTE, VT, SMS, while non-native services may include data rich services such as RCS and other data-centric IMS services. For hybrid IMS, the IMS resides on both the modem processor and the application processor. The modem processor and application processor share a single IP address in order to allow for single registration of all services.

At 2404, the UE may receive a data packet having an identifier of one of the one or more native services or one or more non-native services. For modem-centric solutions, data packets are received first the modem, and may then be forwarded to different processors. In some embodiments, the data packet may be received via WWAN or IWLAN.

At 2406, the UE forwards the data packet to the modem processor or to the application processor based on the identifier. In some embodiments, all video data may be processed by the applications processor and all audio data may be processed by the modem processor.

According to certain aspects, the one or more native services may include at least one of voice over long-term evolution (VoLTE), video telephony (VT), and simple messaging system (SMS) and the one or more non-native service may include a rich communication suite (RCS) service.

According to certain aspects, forwarding the data packet to the application processor may comprise forwarding the data packet via a link between the modem processor and the application processor.

According to certain aspects, forwarding the data packet to the modem processor or to the application processor based on the identifier may comprise forwarding the data packet to the modem if the identifier indicates an audio service and forwarding the data packet to the application processor if the data packet indicates a video service. For some embodiments, data packets indicating audio service and data packets indicating video service may be synched.

According to certain aspects, forwarding the data packet to the modem processor or to the application processor based on the identifier may comprise forwarding the data packet to the modem if the identifier indicates an audio service and forwarding the data packet to the application processor if the data packet indicates a rich communication suite (RCS) service.

According to certain aspects, the IMS server may comprise a real-time transport protocol (RTP) stack.

According to certain aspects, the RTP stack may reside on the modem processor or the application processor. In some embodiments, the RTP stack may be dynamically moved from the modem processor to the application processor or from the application processor to the modem processor. According to certain aspects, a portion of the RTP stack resides on the modem processor and a portion of the RTP stack resides on the application processor.

According to certain aspects, registering the UE for one or more native services may include registering for each of the one or more native services with a feature tag and registering the UE for one or more non-native services may include registering for each of the one or more non-native services with a feature tag. In some embodiments, the identifier may correspond to the feature tag of one of the one or more native services or one of the one or more non-native services.

According to certain aspects, the data packet may be received from the application processor. In some embodiments, the application processor may comprise an IMS enabler and the data packet may be provided by the IMS enabler.

According to certain aspects, the data packet may be received from a wireless wide area network (WWAN). Alternatively, the data packet may be received from an interworking wireless local area network (IWLAN).

According to certain aspects, the application processor may be configured to generate IMS requests related to the one or more non-native services, wherein the IMS requests related to the one or more non-native services may be sent to a network through an IMS framework of the modem processor.

According to certain aspects, the IMS framework of the modem processor may comprise a dispatcher that forwards the IMS requests related to the one or more non-native services to the network. In some embodiments, the dispatcher may forward the IMS requests related to the one or more non-native services to the network through a network connection maintained by the modem processor. In some embodiments, the dispatcher may forward the IMS requests related to the one or more non-native services to the network through a network connection maintained by a different modem processor.

According to certain aspects, the application processor may be configured to host one or more applications that use the one or more native services. In some embodiments, the one or more applications may communicate with the one or more native services through an interface between the application processor and the modem processor. In some embodiments, the one or more native services used by the one or more applications generate IMS requests on behalf of the one or more applications.

According to certain aspects, the modem processor may comprise a dispatcher that may forward the IMS requests generated on behalf of the one or more applications to a network. In some embodiments, the dispatcher may forward IMS requests generated by the application processor to a network. In some embodiments, the dispatcher may forward the IMS requests generated on behalf of the one or more applications and the IMS requests generated by the application processor to the network through a network connection maintained by the modem processor. In some embodiments, the dispatcher may forward the IMS requests generated on behalf of the one or more applications and the IMS requests generated by the application processor to the network through a network connection maintained by a different modem.

Example operation for wireless communication are provided, in accordance with certain aspects of the present disclosure. The operations may begin by establishing a network connection between an application processor of a user equipment (UE) with a packet data network (PDN), wherein the network connection is established in response to a request from an internet protocol (IP) multimedia subsystem (IMS) entity of a modem of the UE. Access to the PDN may be provided to one or more IMS entities of the modem through the network connection The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in the Figures, those operations may be performed by any suitable corresponding counterpart means-plus-function components.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available medium that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

As used herein, a phrase referring to "at least one of" a list of items refers to any combination of those items, including single members. As an example, "at least one of a, b, or c" is intended to cover a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
registering a user equipment (UE) with an internet protocol (IP) multimedia subsystem (IMS) server for one or more native services and for one or more non-native services, wherein the UE comprises a modem processor and an application processor, wherein the registering comprises a registration to obtain an internet protocol (IP) address shared by the modem processor and the application processor for both the one or more native services and the one or more non-native services;
receiving, at the UE, a data packet having an identifier of one of the one or more native services or one of the one or more non-native services;
forwarding the data packet to the modem processor or to the application processor based on the identifier, wherein forwarding the data packet to the modem processor or to the application processor based on the identifier comprises forwarding the data packet to the modem processor if the identifier indicates an audio service and forwarding the data packet to the application processor if the data packet indicates a video service; and
synching data packets indicating audio service and data packets indicating video service, wherein the synching comprises using a delay coefficient to account for delays of forwarding the data packet of the application processor.

2. The method of claim 1, wherein the one or more native services includes at least one of voice over long-term evolution (VoLTE), video telephony (VT), or simple messaging system (SMS) and the one or more non-native service includes a rich communication suite (RCS) service.

3. The method of claim 1, wherein forwarding the data packet to the application processor comprises forwarding the data packet via a link between the modem processor and the application processor.

4. The method of claim 1, wherein forwarding the data packet to the modem processor or to the application processor based on the identifier comprises forwarding the data packet to the application processor if the data packet indicates a rich communication suite (RCS) service.

5. The method of claim 1, wherein the IMS server comprises a real-time transport protocol (RTP) stack.

6. The method of claim 5, wherein the RTP stack resides on the modem processor or the application processor.

7. The method of claim 6, wherein the RTP stack may be dynamically moved from the modem processor to the application processor or from the application processor to the modem processor.

8. The method of claim 5, wherein a portion of the RTP stack resides on the modem processor and a portion of the RTP stack resides on the application processor.

9. The method of claim 1, wherein registering the UE for one or more native services includes registering for each of the one or more native services with a first feature tag, and wherein registering the UE for one or more non-native services includes registering for each of the one or more non-native services with a second feature tag.

10. The method of claim 9, wherein the identifier corresponds to the first feature tag of one of the one or more native services or the second feature tag of one of the one or more non-native services.

11. The method of claim 1, wherein the data packet is received from the application processor.

12. The method of claim 11, wherein the application processor comprises an IMS enabler and the data packet is provided by the IMS enabler.

13. The method of claim 1, wherein the data packet is received from a wireless wide area network (WWAN).

14. The method of claim 1, wherein the data packet is received from an interworking wireless local area network (IWLAN).

15. The method of claim 1, wherein the application processor is configured to generate IMS requests related to the one or more non-native services, wherein the IMS requests related to the one or more non-native services are sent to a network through an IMS framework of the modem processor.

16. The method of claim 15, wherein the IMS framework of the modem processor comprises a dispatcher that forwards the IMS requests related to the one or more non-native services to the network.

17. The method of claim 16, wherein the dispatcher forwards the IMS requests related to the one or more non-native services to the network through a network connection maintained by the modem processor.

18. The method of claim 16, wherein the dispatcher forwards the IMS requests related to the one or more non-native services to the network through a network connection maintained by a different modem processor.

19. The method of claim 1, wherein the application processor is configured to host one or more applications that use the one or more native services.

20. The method of claim 19, wherein the one or more applications communicate with the one or more native services through an interface between the application processor and the modem processor.

21. The method of claim 19, wherein the one or more native services used by the one or more applications generate IMS requests on behalf of the one or more applications.

22. The method of claim 21, wherein the modem processor comprises a dispatcher that forwards the IMS requests generated on behalf of the one or more applications to a network.

23. The method of claim 22, wherein the dispatcher forwards IMS requests generated by the application processor to the network.

24. The method of claim 23, wherein the dispatcher forwards the IMS requests generated on behalf of the one or more applications and the IMS requests generated by the application processor to the network through a network connection maintained by the modem processor.

25. The method of claim 24, wherein the dispatcher forwards the IMS requests generated on behalf of the one or more applications and the IMS requests generated by the application processor to the network through a network connection maintained by a different modem.

26. An apparatus for wireless communication, comprising:
means for registering a user equipment (UE) with an internet protocol (IP) multimedia subsystem (IMS) server for one or more native services and for one or more non-native services, wherein the UE comprises a modem processor and an application processor, wherein the registering comprises a registration to obtain an internet protocol (IP) address shared by the modem processor and the application processor for both the one or more native services and the one or more non-native services;
means for receiving, at the UE, a data packet having an identifier of one of the one or more native services or one or more non-native services;
means for forwarding the data packet to the modem processor or to the application processor based on the identifier, wherein forwarding the data packet to the modem processor or to the application processor based on the identifier comprises forwarding the data packet to the modem processor if the identifier indicates an audio service and forwarding the data packet to the application processor if the data packet indicates a video service; and
means for synching data packets indicating audio service and data packets indicating video service, wherein the synching comprises using a delay coefficient to account for delays of forwarding the data packet of the application processor.

27. The apparatus of claim 26, wherein the one or more native services includes at least one of voice over long-term evolution (VoLTE), video telephony (VT), or simple messaging system (SMS) and the one or more non-native service includes a rich communication suite (RCS) service.

28. The apparatus of claim 26, wherein the means for forwarding the data packet to the application processor comprises means for forwarding the data packet via a link between the modem processor and the application processor.

29. The apparatus of claim 26, wherein forwarding the data packet to the modem processor or to the application processor based on the identifier comprises forwarding the data packet to the application processor if the data packet indicates a rich communication suite (RCS) service.

30. The apparatus of claim 26, wherein the IMS server comprises a real-time transport protocol (RTP) stack.

31. The apparatus of claim 30, wherein the RTP stack resides on the modem processor or the application processor.

32. The apparatus of claim 31, wherein the RTP stack may be dynamically moved from the modem processor to the application processor or from the application processor to the modem processor.

33. The apparatus of claim 30, wherein a portion of the RTP stack resides on the modem processor and a portion of the RTP stack resides on the application processor.

34. The apparatus of claim 26, wherein means for registering the UE for one or more native services includes means for registering the UE for each of the one or more native services with a first feature tag, and wherein means for registering the UE for one or more non-native services includes means for registering the UE for each of the one or more non-native services with a second feature tag.

35. The apparatus of claim 34, wherein the identifier corresponds to the first feature tag of one of the one or more native services or the second feature tag of one of the one or more of the non-native services.

36. The apparatus of claim 26, wherein the data packet is received from the application processor.

37. The apparatus of claim 36, wherein the application processor comprises an IMS enabler and the data packet is provided by the IMS enabler.

38. The apparatus of claim 26, wherein the data packet is received from a wireless wide area network (WWAN).

39. The apparatus of claim 26, wherein the data packet is received from an interworking wireless local area network (IWLAN).

40. The apparatus of claim 26, wherein the application processor is configured to generate IMS requests related to the non-native services, wherein the IMS requests related to the non-native services are sent to a network through an IMS framework of the modem processor.

41. The apparatus of claim 40, wherein the IMS framework of the modem processor comprises a dispatcher that forwards the IMS requests related to the one or more non-native services to the network.

42. The apparatus of claim 41, wherein the dispatcher forwards the IMS requests related to the one or more non-native services to the network through a network connection maintained by the modem processor.

43. The apparatus of claim 41, wherein the dispatcher forwards the IMS requests related to the one or more non-native services to the network through a network connection maintained by a different modem processor.

44. The apparatus of claim 26, wherein the application processor is configured to host one or more applications that use the one or more native services.

45. The apparatus of claim 44, wherein the one or more applications communicate with the one or more native services through an interface between the application processor and the modem processor.

46. The apparatus of claim 44, wherein the one or more native services used by the one or more applications generate IMS requests on behalf of the one or more applications.

47. The apparatus of claim 46, wherein the modem processor comprises a dispatcher that forwards the IMS requests generated on behalf of the one or more applications to a network.

48. The apparatus of claim 47, wherein the dispatcher forwards IMS requests generated by the application processor to the network.

49. The apparatus of claim 48, wherein the dispatcher forwards the IMS requests generated on behalf of the one or more applications and the IMS requests generated by the application processor to the network through a network connection maintained by the modem processor.

50. The apparatus of claim 48, wherein the dispatcher forwards the IMS requests generated on behalf of the one or more applications and the IMS requests generated by the application processor to the network through a network connection maintained by a different modem.

51. An apparatus for wireless communication, comprising:
at least one processor configured to:
register a user equipment (UE) with an internet protocol (IP) multimedia subsystem (IMS) server for one or more native services and for one or more non-native services, wherein the UE comprises a modem processor and an application processor, wherein the at least one processor registers the UE using a registration to obtain an internet protocol (IP) address shared by the modem processor and the application processor for both the one or more native services and the one or more non-native services;
receive a data packet, at the UE, having an identifier of one of the one or more native services or one or more non-native services;
forward the data packet to the modem processor or to the application processor based on the identifier, wherein forwarding the data packet to the modem processor or to the application processor based on the identifier comprises forwarding the data packet to the modem processor if the identifier indicates an audio service and forwarding the data packet to the application processor if the data packet indicates a video service; and
synch data packets indicating audio service and data packets indicating video service, wherein the synching comprises using a delay coefficient to account for delays of forwarding the data packet of the application processor; and
a memory coupled with the at least one processor.

52. A non-transitory computer-readable medium having computer executable code stored thereon for:
registering a user equipment (UE) with an internet protocol (IP) multimedia subsystem (IMS) server for one or more native services and for one or more non-native services, wherein the UE comprises a modem processor and an application processor, wherein the registering comprises a registration to obtain an internet protocol (IP) address shared by the modem processor and the application processor for both the one or more native services and the one or more non-native services;
receiving a data packet, at the UE, having an identifier of one of the one or more native services or one or more non-native services;
forwarding the data packet to the modem processor or to the application processor based on the identifier, wherein forwarding the data packet to the modem processor or to the application processor based on the identifier comprises forwarding the data packet to the modem processor if the identifier indicates an audio service and forwarding the data packet to the application processor if the data packet indicates a video service; and
synching data packets indicating audio service and data packets indicating video service, wherein the synching comprises using a delay coefficient to account for delays of forwarding the data packet of the application processor.

* * * * *